(12) United States Patent
Fraser et al.

(10) Patent No.: US 7,955,861 B2
(45) Date of Patent: Jun. 7, 2011

(54) LUMINESCENT DIKETONATE POLYMERS

(75) Inventors: Cassandra L. Fraser, Charlottesville, VA (US); Guoqing Zhang, Charlottesville, VA (US); Jianbin Chen, Foshan (CN)

(73) Assignee: University of Virginia Patent Foundation, Charlottesville, VA (US)

( * ) Notice: Subject to any disclaimer, the term of this patent is extended or adjusted under 35 U.S.C. 154(b) by 0 days.

(21) Appl. No.: 12/326,541

(22) Filed: Dec. 2, 2008

(65) Prior Publication Data

US 2009/0137057 A1    May 28, 2009

Related U.S. Application Data

(60) Provisional application No. 60/903,020, filed on Feb. 23, 2007, provisional application No. 60/842,237, filed on Sep. 5, 2006, provisional application No. 60/810,593, filed on Jun. 2, 2006.

(51) Int. Cl.
  *G01N 21/76* (2006.01)
(52) U.S. Cl. ........ 436/172; 436/127; 436/128; 436/164; 568/300; 568/303
(58) Field of Classification Search .......... None
See application file for complete search history.

(56) References Cited

U.S. PATENT DOCUMENTS

| | | | |
|---|---|---|---|
| 4,062,831 A | 12/1977 | Kopecek |
| 4,074,039 A | 2/1978 | Lim |
| 4,587,101 A | 5/1986 | Marsoner |
| 5,030,420 A | 7/1991 | Bacon |
| 5,037,883 A | 8/1991 | Kopecek |
| 5,043,286 A | 8/1991 | Khalil |
| 5,258,453 A | 11/1993 | Kopecek |
| 5,415,864 A | 5/1995 | Kopecek |
| 5,462,879 A | 10/1995 | Bentsen |
| 6,652,837 B1 | 11/2003 | Edwards |
| 6,916,894 B2 | 7/2005 | Cammack |
| 6,977,138 B2 | 12/2005 | Lahann |
| 7,112,361 B2 | 9/2006 | Lynn |
| 7,179,487 B1 | 2/2007 | Kopecek |
| 7,220,840 B2 | 5/2007 | Ruben |

FOREIGN PATENT DOCUMENTS

JP    2000 159777    6/2000

OTHER PUBLICATIONS

International Search Report for PCT/US2007/13211.
Bachmeier et al., Cell Physiol Biochem, 2007, 19, pp. 137-152.
Bender et al., J. Am. Chem. Soc. 2002, 124, pp. 8526-8527.
Contreras et al., ACS Nano 2010, vol. 4 No. 5, pp. 2735-2747.
Fraser et al, Matls. Today, Oct. 2009, vol. 12 No. 10, pp. 48-50.
Kersey, et al., BNP PEG, 2010 submitted.
Pfister et al., ACS Nano, 2008, vol. N0. 6, 1252-1258.
Zhang et al., Inorganic Chem., 2010, Vol. XXX, No. XX, XXXX, pp. 1-3.
Zhang et al., Adv. Mater., 2008, Adv. Mater. 2008, 20, pp. 1-6.
Zhang et al., J. Am. Chem. Soc. 2007, 129, pp. 8942-8943.
Zhang et al., J. Am. Chem. Soc. 2010, 132, pp. 2160-2162.
Zhang et al., Macromolecules, vol. 42, No. 8, 2009, pp. 3092-3097.
Zhang et al., Macromolecules, vol. 42, No. 8, 2009, pp. 3162-3169.
Zhang et al., Macromolecules, vol. 42, No. 22, 2009, pp. 8627-8633.
Zhang et al., Nature Materials, vol. 8, Sep. 2009, p. 747-751.

*Primary Examiner* — Yelena G Gakh
*Assistant Examiner* — David Weisz
(74) *Attorney, Agent, or Firm* — Rodney L. Sparks

(57) ABSTRACT

The present invention provides in one aspect polymeric luminescent dye compounds having fluorescent properties, phosphorescent properties, or both fluorescent and phosphorescent properties.

21 Claims, 5 Drawing Sheets

LUMINESCENT DIKETONATE POLYMERS

PRIORITY

This application is a continuation under 35 U.S.C. §111(a) of PCT/US2007/013211 filed on Jun. 4, 2007 and published in English as WO 2007/143209 A2 on Dec. 13, 2007; which International Application claims priority from U.S. Provisional Application No. 60/810,593, filed Jun. 2, 2006, U.S. Provisional Application No. 60/842,237, filed Sep. 5, 2006 and U.S. Provisional Application No. 60/903,020, filed Feb. 23, 2007 the disclosures of which are incorporated by reference.

GOVERNMENT FUNDING

This invention was made with United States Government support under Grant No. CHE-0350121 awarded by the National Science Foundation. The United States Government has certain rights in this invention.

BACKGROUND

There are many of optical oxygen sensing systems based on Ru, Pt, or Ir heavy metal luminophores. However, oxygen sensors based on non-heavy metal luminophores with unusual dual emissive properties (e.g., based on boron), particularly single component systems with biocompatible "green" polymers are very rare. Fluorescent boron difluoride dyes such as "bodipy" and boron diketonates possess large molar extinction coefficients and two-photon absorption cross sections, high emission quantum yields and sensitivity to the surrounding medium. These features have been exploited in lasers, imaging agents, molecular probes, and photosensitizers. As two-photon absorbers, they are compatible with optical imaging technologies employing tunable Ti:sapphire lasers (700-1100 nm). Focused, longer wavelength IR excitation corresponds with greater tissue penetration, and reduced cell damage and interference from biological absorbers. Boron difluoride diketonate dyes possess large dipole moments and their emission wavelength sensitive to the polarity of the surrounding medium. Thus, solvatochromic boron complexes serve as probes of their local environments.

A typical dual emissive system works as described below. Though boron dye fluorescence is well known, phosphorescence is usually only observed in the presence of toxic heavy atom substituents or additives (e.g., Pb, Tl, or halogens such as I, Br), at low temperatures, or in rigid, solid matrices, which can be difficult to process and often are not biocompatible and biodegradable. Phosphorescence is quenched by oxygen, which at room temperature more accurately and conveniently may serve as the basis for quantitative optical oxygen sensing. Single component, readily processable systems exhibiting both fluorescence and phosphorescence are rare and may be adapted for imaging and ratiometric sensing. Fluorescence (short emission lifetimes) serves as an invariant feature providing information to quantify and locate the dye/emitter, whereas phosphorescence (long emission lifetimes) is quenched to variable extents depending upon the amount of oxygen that is present. Phosphorescent materials with long emission lifetimes are more sensitive to oxygen, and may serve as highly sensitive oxygen sensors in low oxygen environments (food packaging, hypoxic tumor or cardiovascular tissues, tissue engineering matrices, etc.) Luminescent materials can also be used as photosensitizers, transferring energy to other molecules, and generating reactive species by light activation. For example, this feature is exploited in photodynamic therapy, generating reactive singlet oxygen to selectively damage tumor tissue, and in lithography with two-photon dyes.

Currently, there is a need for compounds that have the ability to both fluoresce and phosphoresce. There is also a need for sensors that can be used to detect oxygen at low levels in tumors and cardiovascular tissue.

SUMMARY

The present invention provides in one aspect polymeric luminescent dye compounds having fluorescent properties, phosphorescent properties, or both fluorescent and phosphorescent properties. Accordingly, the invention provides compounds having formula I:

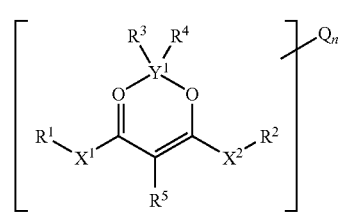

wherein $R^1$ and $R^2$ are independently $(C_6\text{-}C_{22})$aryl or $(C_5\text{-}C_{21})$heteroaryl. The $R^1$ and $R^2$ groups are optionally independently substituted with 1, 2, 3, 4, 5, 6, 7, 8, 9, 10, 11, 12, 13, 14, or 15 substituent groups; where the substituent groups are halo, $(C_1\text{-}C_{12})$alkyl, hydroxy$(C_1\text{-}C_{12})$alkyl, halo$(C_1\text{-}C_{12})$alkyl, $R^{15}O(C_1\text{-}C_{12})$alkyl, $R^{15}O(C_1\text{-}C_{12})$alkyl-O—, $(C_2\text{-}C_{12})$alkenyl, $(C_7\text{-}C_{26})$aralkyl, $(C_5\text{-}C_{13})$heteroaryl, —$OR^{15}$, oxo(>C═O), —CN, —$NO_2$, —$CO_2R^{15}$, —$OC(O)R^{16}$, —$C(O)R^{16}$, —$NR^{13}R^{14}$, —$N(R^{23})C(O)R^{24}$, —$C(O)NR^{17}R^{18}$, —$SR^{19}$, —$SO_2R^{20}$; —$OSi(R^{25})_3$, —$Si(R^{25})_3$, —$Si(R^{25})_i(OR^{25})_j$, —$P(OR^{25})_3$, —$P(R^{25})_3$, isocyanate, isothiocyanate, urea, or thiourea; or two substituent groups can form a ring together with the atom to which they are attached optionally having from 3 to 8 ring atoms and optionally having 1, 2, or 3 heteroatoms; each $R^{25}$ is independently hydrogen, alkyl or aryl; where i and j are independently 1, 2, or 3 and the sum of i and j is 3;

$Y^1$ is Al or B; $X^1$ and $X^2$ are independently a bond, alkyl, alkenyl, alkynyl or aryl, optionally substituted with 1, 2, 3, 4, 5, or 6 substituent groups; where the substituent groups are halo, $(C_1\text{-}C_{12})$alkyl, hydroxy$(C_1\text{-}C_{12})$alkyl, halo$(C_1\text{-}C_{12})$alkyl, $R^{15}O(C_1\text{-}C_{12})$alkyl, $R^{15}O(C_1\text{-}C_{12})$alkyl-O—, $(C_2\text{-}C_{12})$alkenyl, $(C_7\text{-}C_{26})$aralkyl, $(C_5\text{-}C_{13})$heteroaryl, —$OR^{15}$, oxo (>C═O), —CN, —$NO_2$, —$CO_2R^{15}$, —$OC(O)R^{16}$, —$C(O)R^{16}$, —$NR^{13}R^{14}$, —$N(R^{23})C(O)R^{24}$, —$C(O)NR^{17}R^{18}$, —$SR^{19}$, —$SO_2R^{20}$, —$OSi(R^{25})_3$, —$Si(R^{25})_3$, —$Si(R^{25})_i(OR^{25})_j$, —$P(OR^{25})_3$, —$P(R^{25})_3$, isocyanate, isothiocyanate, urea, thiourea or two substituent groups can form a ring together with the atom to which they are attached optionally having from 3 to 8 ring atoms and optionally having 1, 2, or 3 heteroatoms; where i and j are independently 1, 2, or 3 and the sum of i and j is 3;

$R^3$ and $R^4$ are independently, halo, hydroxy, $R^{15}O(C_1\text{-}C_{12})$ alkyl, $R^{15}O(C_1\text{-}C_{12})$alkyl, or —$OR^{15}$; or $R^3$ and $R^4$ taken together form a bidentate chelate, such as deprotonated acid or diacid group, HOC(═O)$CH_2$C(═O)OH (malonic acid) or HOC(═O)$CH_2$C(═O)OH (oxalic acid), or chelating group such as acid-alcohol, acid-ether, with two donor groups, or $R^3$ and $R^4$ taken together with the boron atom form a ring having the formula:

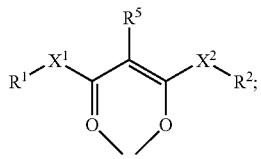

$R^5$ is hydrogen, halo, $(C_1-C_{12})$alkyl, hydroxy$(C_1-C_{12})$alkyl, halo$(C_1-C_{12})$alkyl, $(C_2-C_{12})$alkenyl, $(C_7-C_{26})$aralkyl, $(C_5-C_{13})$heteroaryl, $-OR^{15}$, $-CN$, $-NO_2$, $-CO_2R^{15}$, $-OC(O)R^{16}$, $-C(O)R^{16}$, $-NR^{13}R^{14}$, $-N(R^{23})C(O)R^{24}$, $-C(O)NR^{17}R^{18}$, $-SR^{19}$, $-SO_2R^{20}$ or $-SO_3H$; or wherein $R^{13}$, $R^{14}$, $R^{15}$, $R^{16}$, $R^{17}$, $R^{18}$, $R^{19}$, $R^{20}$, $R^{23}$ and $R^{24}$ are independently hydrogen, alkyl, alkenyl, $(C_3-C_{12})$cycloalkyl, aryl, aralkyl or haloalkyl; each Q is a polymer chain where each chain is conjugated directly to the compound (e.g., via a covalent, coordinate, ionic, or hydrogen bond) through one of $R^1$, $R^2$, $R^5$, $X^1$, $X^2$ or to a substituent attached to $R^1$, $R^2$, $R^5$, $X^1$, or $X^2$; and n is 1, 2, 3, 4, 5, 6, 7, 8, 9, 11, 12, 13, 14, or 15; or a pharmaceutically acceptable salt thereof.

In another aspect the invention provides luminescent dye compositions having a polymer in combination with a luminescent dye compound formula II:

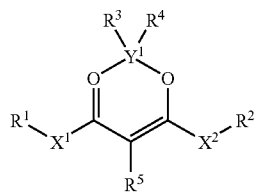

wherein the composition has fluorescent properties, phosphorescent properties, or both fluorescent and phosphorescent properties. In the luminescent dye compounds $R^1$ and $R^2$ are independently $(C_6-C_{22})$aryl or $(C_5-C_{21})$heteroaryl. The $R^1$ and $R^2$ groups are optionally independently substituted with 1, 2, 3, 4, 5, 6, 7, 8, 9, 10, 11, 12, 13, 14, or 15 substituent groups; where the substituent groups are halo, $(C_1-C_{12})$alkyl, hydroxy$(C_1-C_{12})$alkyl, halo$(C_1-C_{12})$alkyl, $R^{15}O(C_1-C_{12})$alkyl, $R^{15}O(C_1-C_{12})$alkyl-O—, $(C_2-C_{12})$alkenyl, $(C_7-C_{26})$aralkyl, $(C_5-C_{13})$heteroaryl, $-OR^{15}$, oxo (>C=O), $-CN$, $-NO_2$, $-CO_2R^{15}$, $-OC(O)R^{16}$, $-C(O)R^{16}$, $-NR^{13}R^{14}$, $-N(R^{23})C(O)R^{24}$, $-C(O)NR^{17}R^{18}$, $-SR^{19}$, $-SO_2R^{20}$; $-OSi(R^{25})_3$, $-Si(R^{25})_3$, $-Si(R^{25})_i(OR^{25})_j$, $-P(OR^{25})_3$, $-P(R^{25})_3$, isocyanate, isothiocyanate, urea, or thiourea; or two substituent groups can form a ring together with the atom to which they are attached optionally having from 3 to 8 ring atoms and optionally having 1, 2, or 3 heteroatoms; each $R^{25}$ is independently hydrogen, alkyl or aryl; where i and j are independently 1, 2, or 3 and the sum of i and j is 3;

$Y^1$ is Al or B; $X^1$ and $X^2$ are independently a bond, alkyl, alkenyl, alkynyl or aryl, optionally substituted with 1, 2, 3, 4, 5, or 6 substituent groups; where the substituent groups are halo, $(C_1-C_{12})$alkyl, hydroxy$(C_1-C_{12})$alkyl, halo$(C_1-C_{12})$alkyl, $R^{15}O(C_1-C_{12})$alkyl, $R^{15}O(C_1-C_{12})$alkyl-O—, $(C_2-C_{12})$alkenyl, $(C_7-C_{26})$aralkyl, $(C_5-C_{13})$heteroaryl, $-OR^{15}$, oxo (>C=O), $-CN$, $-NO_2$, $-CO_2R^{15}$, $OC(O)R^{16}$, $-C(O)R^{16}$, $-NR^{13}R^{14}$, $-N(R^{23})C(O)R^{24}$, $-C(O)NR^{17}R^{18}$, $-SR^{19}$, $-SO_2R^{20}$; $-OSi(R^{25})_3$, $-Si(R^{25})_i(OR^{25})_j$, $-P(R^{25})_3$, $-P(R^{25})_3$, isocyanate, isothiocyanate, urea, or thiourea; or two substituent groups can form a ring together with the atom to which they are attached optionally having from 3 to 8 ring atoms and optionally having 1, 2, or 3 heteroatoms; each $R^{25}$ is independently hydrogen, alkyl or aryl; where i and j are independently 1, 2, or 3 and the sum of i and j is 3;

$R^3$ and $R^4$ are independently, halo, hydroxy, $R^{15}O(C_1-C_{12})$alkyl, $R^{15}O(C_1-C_{12})$alkyl, or $-OR^{15}$; or $R^3$ and $R^4$ taken together form a bidentate chelate, such as deprotonated acid or diacid group, $HOC(=O)CH_2C(=O)OH$ (malonic acid) or $HOC(=O)CH_2C(=O)OH$ (oxalic acid), or chelating group such as acid-alcohol, acid-ether, with two donor groups, or $R^3$ and $R^4$ taken together with the boron atom form a ring having the formula:

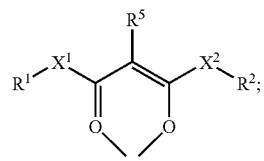

$R^5$ is hydrogen, halo, $(C_1-C_{12})$alkyl, hydroxy$(C_1-C_{12})$alkyl, halo$(C_1-C_{12})$alkyl, $(C_2-C_{12})$alkenyl, $(C_7-C_{26})$aralkyl, $(C_5-C_{13})$heteroaryl, $-OR^{15}$, $-CN$, $-NO_2$, $-CO_2R^{15}$, $-OC(O)R^{16}$, $-C(O)R^{16}$, $-NR^{13}R^{14}$, $-N(R^{23})C(O)R^{24}$, $-C(O)NR^{17}R^{18}$, $-SR^{19}$, $-SO_2R^{20}$ or $-SO_3H$; or wherein $R^{13}$, $R^{14}$, $R^{15}$, $R^{16}$, $R^{17}$, $R^{18}$, $R^{19}$, $R^{20}$, $R^{23}$, and $R^{24}$ are independently hydrogen, alkyl, alkenyl, $(C_3-C_{12})$cycloalkyl, aryl, aralkyl or haloalkyl; or a pharmaceutically acceptable salt thereof.

In another aspect the invention provides luminescent dyes that are color tunable, e.g., the color from the fluorescence or phosphorescence of the luminescent dye may be altered by changing the groups, e.g., $R^1$, $R^2$; $R^5$, $X^1$ and $X^2$ attached to diketone core, or by varying the polymer molecular weight (for polymer-dye conjugates) and concentration or loading of the dye in the polymer (for blends).

In another aspect, the luminescent dye polymers and compositions can be readily processed into powders, films, particles (including e.g., nanoparticles), fibers (including e.g., nanofibers), coatings, bulk materials, gels, networks, assemblies, suspensions, composites, and the like.

The above summary of the present invention is not intended to describe each disclosed embodiment or every implementation of the present invention. Other features, objects, and advantages of the invention will be apparent from the description and drawings, and from the claims. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

For the purpose of illustrating the invention, there are depicted in the drawings certain embodiments of the invention. However, the invention is not limited to the precise arrangements and instrumentalities of the embodiments depicted in the drawings.

DETAILED DESCRIPTION

Figure 1:
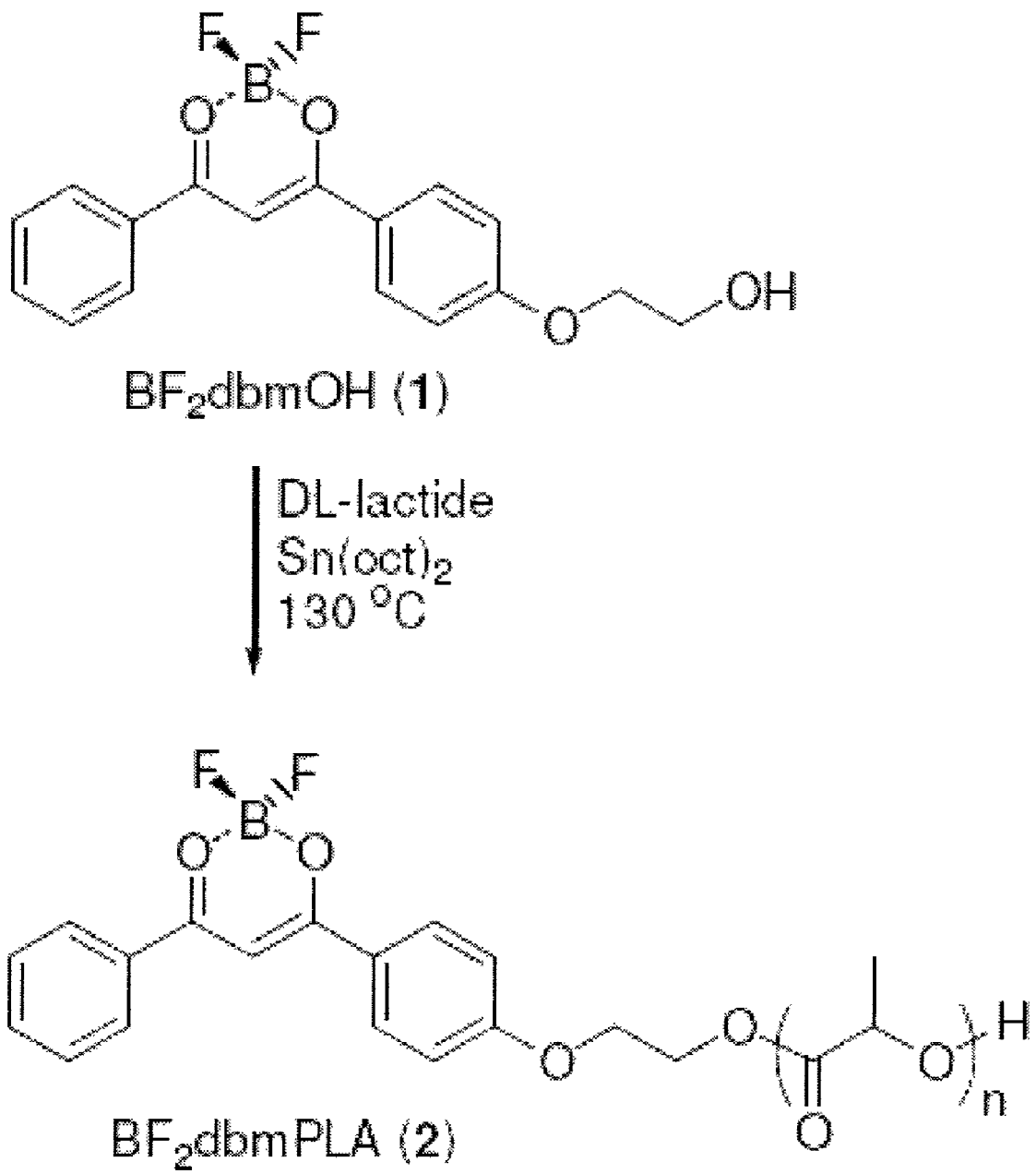
FIG. 1 is an illustration of the synthesis of the boron polylactide polymer, BF$_2$dbmPLA, from a primary alcohol functionalized difluoroboron dibenzoylmethane initiator, BF$_2$dbmOH.

Boron or aluminium substituted compounds (e.g., boron difluoride) can be bound to functionalized diketones (e.g., dibenzoylmethane) and used as initiators for polymerization of lactide and other monomers. Luminescent dye groups are introduced in the polymeric material (e.g., biodegradable and biocompatible polylactide) on specific sites in the polymer architecture with control. Block copolymers capable of nanoscale self assembly are possible. The compounds and compositions of the invention are useful as imaging agents, probes, readily processable photosensitizers, sensors (e.g., oxygen, ratiometric, both intensity and lifetime based; temperature; moisture; pH), laser dyes, optical fibers, waveguides, light emitting materials for displays, biocompatible polymers, solvatochromic materials, lithographic materials, photodegradable materials, photoactivated oxidizing agents, colorants, inks, reactive dyes, and the like. The photosensitizers can be used to produce a beneficial effect in photodynamic therapy for treatment of tumors.

Nanoparticles prepared from the disclosed luminescent dye polymers and compositions can be taken up and internalized by cells, which is useful for imaging. Also, the leaky vasculature of tumors allows for passive targeting via the enhanced permeation and retention (EPR) effect, with the possibility for imaging. The oxygen sensing ability of the luminescent dye polymers and compositions will allow analysis of the tumor. Generation of singlet oxygen (e.g. via phosphorescence quenching) can serve as a photodynamic therapy.

The disclosed luminescent dye polymers and compositions can be used to prepare oxygen sensors that can be placed in food or drug packages and allow measurement of oxygen within the package. The luminescent dye polymers and compositions can be used as a film, on fibers within the packaging, etc.

The following definitions are used, unless otherwise described: halo includes fluoro, chloro, bromo, or iodo. Alkyl, alkoxy, alkenyl, alkynyl, etc. denote both straight and branched groups; but reference to an individual radical such as "propyl" embraces only the straight chain radical, a branched chain isomer such as "isopropyl" being specifically referred to. Aryl denotes a phenyl radical or an ortho-fused bicyclic carbocyclic radical having about nine to ten ring atoms in which at least one ring is aromatic. Heteroaryl encompasses a radical attached via a ring carbon of a monocyclic aromatic ring containing five or six ring atoms consisting of carbon and one to four heteroatoms. The heteroatoms include non-peroxide oxygen, sulfur, silane, nitrogen and phosphorous wherein suitable substituents as known in the art can be attached to the hetero atoms, e.g., hydrogen, O, (C$_1$-C$_{12}$)alkyl, phenyl or benzyl, as well as a radical of an ortho-fused bicyclic heterocycle of about eight to ten ring atoms derived therefrom, particularly a benz-derivative or one derived by fusing a propylene, trimethylene, or tetramethylene diradical thereto.

It will be appreciated by those skilled in the art that compounds of the invention having a chiral center may exist in and be isolated in optically active and racemic forms. Some compounds may exhibit polymorphism. It is to be understood that the present invention encompasses any racemic, optically-active, polymorphic, or stereoisomeric form, or mixtures thereof, of a compound of the invention, which possess the useful properties described herein, it being well known in the art how to prepare optically active forms (for example, by resolution of the racemic form by recrystallization techniques, by synthesis from optically-active starting materials, by chiral synthesis, or by chromatographic separation using a chiral stationary phase).

Specific and preferred values listed below for radicals, substituents, and ranges, are for illustration only. They do not exclude other defined values or other values within defined ranges for the radicals and substituents. Specifically, (C$_1$-C$_{12}$) alkyl can be methyl, ethyl, propyl, isopropyl, butyl, iso-butyl, sec-butyl, pentyl, 3-pentyl, hexyl and the like; (C$_3$-C$_{12}$)cycloalkyl can be cyclopropyl, cyclobutyl, cyclopentyl, or cyclohexyl and the like; (C$_3$-C$_{12}$)cycloalkyl(C$_1$-C$_8$)alkyl can be cyclopropylmethyl, cyclobutylmethyl, cyclopentylmethyl, cyclohexylmethyl, 2-cyclopropylethyl, 2-cyclobutylethyl, 2-cyclopentylethyl, or 2-cyclohexylethyl and the like; (C$_1$-C$_{10}$)alkoxy can be methoxy, ethoxy, propoxy, isopropoxy, butoxy, iso-butoxy, sec-butoxy, pentoxy, 3-pentoxy, or hexyloxy and the like; (C$_2$-C$_{12}$)alkenyl can be vinyl, allyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl and the like; (C$_2$-C$_{12}$)alkynyl can be ethynyl, 1-propynyl, 2-propynyl, 1-butynyl, 2-butynyl, 3-butynyl, 1-pentynyl, 2-pentynyl, 3-pentynyl, 4-pentynyl, 1-hexynyl, 2-hexynyl, 3-hexynyl, 4-hexynyl, or 5-hexynyl and the like; (C$_1$-C$_{12}$)alkanoyl can be acetyl, propanoyl or butanoyl and the like; halo(C$_1$-C$_6$) alkyl can be iodomethyl, bromomethyl, chloromethyl, fluoromethyl, trifluoromethyl, 2-chloroethyl, 2-fluoroethyl, 2,2,2-trifluoroethyl, or pentafluoroethyl and the like; hydroxy (C$_1$-C$_{12}$)alkyl can be hydroxymethyl, 1-hydroxyethyl, 2-hydroxyethyl, 1-hydroxypropyl, 2-hydroxypropyl, 3-hydroxypropyl, 1-hydroxybutyl, 4-hydroxybutyl, 1-hydroxypentyl, 5-hydroxypentyl, 1-hydroxyhexyl, or 6-hydroxyhexyl and the like; (C$_1$-C$_{12}$)alkoxycarbonyl can be methoxycarbonyl, ethoxycarbonyl, propoxycarbonyl, isopropoxycarbonyl, butoxycarbonyl, pentoxycarbonyl, or hexyloxycarbonyl and the like; (C$_1$-C$_{12}$)alkylthio can be methylthio, ethylthio, propylthio, isopropylthio, butylthio, isobutylthio, pentylthio, or hexylthio and the like; (C$_2$-C$_{12}$) alkanoyloxy can be acetoxy, propanoyloxy, butanoyloxy, isobutanoyloxy, pentanoyloxy, or hexanoyloxy and the like; (C$_6$-C$_{22}$)aryl can be phenyl, naphthyl, anthrcyl, phenanthryl, pyryl, naphthacyl, pentacyl, or indenyl and the like; and (C$_5$-C$_{13}$)heteroaryl can be furyl, imidazolyl, triazolyl, triazinyl, oxazoyl, isoxazoyl, thiazolyl, isothiazolyl, pyrazolyl, pyrrolyl, pyrazinyl, tetrazolyl, pyridyl, (or its N-oxide), thienyl, pyrimidinyl (or its N-oxide), indolyl, isoquinolyl (or its N-oxide) or quinolyl (or its N-oxide) and the like.

The polymers, Q, that are conjugated to the formula I compounds or blended with the formula II compounds include any polymeric material that can be conjugated or blended with a formula II compound. In one embodiment, non-toxic pharmaceutically acceptable, biologically stable (or biodegradable) polymers are preferred. Non-limiting examples of pharmaceutically acceptable polymers include polylactide (PLA), polyglycolide, lactide-glycolide copolymer, polycaprolactone, or polyethylene glycol polylactide polymers, polyhydroxybutyrate (PHB), polyhydroxybutyrate-valerate copolymer (PHBV), polybutylene succinate (PBS), polybutylene adipate-co-terephthalate (PBAT), sugar based polymers (e.g., cellulose or starch and the like), peptides, or mixtures thereof. Other exemplary polymers include polyurethanes, polyamides, polyesters, and vinylic polymers. Non-limiting examples of vinylic polymers include acrylates such as polymethyl methacrulate (PMMA), acrylonitrile butadiene styrene (ABS), styrene acrylonitrile (SAN), polystyrenes (PS), polyethylene (PE), polyethylenechlorinates (PEC), polybutadiene (PBD), polydicyclopentadiene (PDCP), polypropylene (PP) Polymethylpentene (PMP), and the like. Other exemplary polymers include silicon-based organic polymers such as polydimethylsiloxane (PDMS), polyesters such as polyethylene terephthalate (PET), glycolized polyester (PETG), polycarbonate (PC) and the like.

Additional exemplary polymers that can be prepared as Q groups or blended with the light emitting compounds include sol gels, aerogels, xerogels Cellulosic polymers, e.g., hydroxypropylmethylcellulose, hydroxyl propyl cellulose, ethyl cellulose and the like; epoxy containing polymers, Ethylene vinyl alcohol, (E/VAL), fluoroplastics, e.g., polytetrafluoroethylene (PTFE), liquid crystal polymers, (LCP), melamine formaldehyde, (MF), phenol-formaldehyde plastic (PF), polyacetal, polyacrylates, polymethacrylates, polyacrylonitrile, (PAN), polyamide, (PA), e.g., nylon, polyamide-imide (PAI), polyaryletherketone (PAEK), polyetheretherketone (PEEK), polyphenylene oxide (PPO), polyphenylene sulfide (PPS), polyphthalamide (PTA), Polysulfone (PSU), polyurethane (PU), polyurea, polyvinylchloride (PVC), polyvinylidene Chloride (PVDC), polyvinylidenedifluoride (PVDF) silicone polymers, poly(ethylene glycol) (PEG), poly(ethylene terephthalate) (PET), Polysiloxanes, silicones, In one embodiment, the composition includes pharmaceutically acceptable polymers, FDA approved polymers or a mixture thereof. In another embodiment, the compositions include polymers prepared from vinyl monomers known in the art. In another embodiment, the invention also provides pharmaceutical compositions comprising a compound of luminescent dye having formula II, or a pharmaceutically acceptable salt thereof, in combination with a pharmaceutically acceptable diluent or carrier.

The term "amino acid" includes the residues of the natural amino acids (e.g. Ala, Arg, Asn, Asp, Cys, Glu, Gln, Gly, His, Hyl, Hyp, Ile, Leu, Lys, Met, Phe, Pro, Ser, Thr, Trp, Tyr, and Val) in D or L form, as well as unnatural amino acids (e.g. phosphorserine, phosphothreonine, phosphotyrosine, hydroxyproline, γ-carboxyglutamate, hippuric acid, octahydroindole-2-carboxylic acid, statine, 1,2,3,4-tetrahydroisoquinoline-3-carboxylic acid, penicillamine, ornithine, citruline, α-methyl-alanine, para-benzoylphenylalanine, phenylglycine, propargylglycine, sarcosine, and tert-butylglycine). The term also comprises natural and unnatural amino acids bearing a conventional amino protecting group (e.g. acetyl or benzyloxycarbonyl), as well as natural and unnatural amino acids protected at the carboxy terminus (e.g., as a $(C_1-C_6)$alkyl, phenyl or benzyl ester or amide; or as an α-methylbenzyl amide). Other suitable amino and carboxy protecting groups are known to those skilled in the art (See for example, T. W. Greene, *Protecting Groups In Organic Synthesis*; Wiley: New York, 1981, and references cited therein).

An amino acid can be linked to the remainder of a compound of formula I through the carboxy terminus, the amino terminus, or through any other convenient point of attachment, such as, for example, through the sulfur of cysteine.

The term "peptide" describes a sequence of 2 to about 25 amino acids (e.g. as defined above) or peptidyl residues. The sequence may be linear or cyclic. For example, a cyclic peptide can be prepared or may result from the formation of disulfide bridges between two cysteine residues in a sequence. A peptide can be linked to the remainder of a compound of formula I through the carboxy terminus, the amino terminus, or through any other convenient point of attachment, such as, for example, through the sulfur of a cysteine. Preferably a peptide comprises 3 to about 25, or about 5 to about 21 amino acids. Peptide derivatives can be prepared as disclosed in U.S. Pat. Nos. 4,612,302; 4,853,371; and 4,684,620. Peptide sequences specifically recited herein are written with the amino terminus on the left and the carboxy terminus on the right.

The compounds having formula I can be conjugated to a polymer through any suitable functional linking group. For example the conjugate can include dye-X, dye-X-Y, dye-X-R-Y, where X and Y can be initiators, terminators or coupling partner with a complimentary reactive group on a polymer (e.g., at the chain end, main chain, side group, etc.). Alternatively, the diketone and the polymer may be linked to generate a "macroligand" (e.g., dbmPLA or dbmPMMA) which is subsequently reacted with a B or Al (e.g. $Y^1$) precursor such as $BF_3$ to generate the luminescent material (e.g., $BF_2$dbmPLA or $BF_2$dbmPMMA). A reactive group (initiator group) can be placed in a formula II compound using any means known in the art. The initiator groups can react with monomers, polymers or oligomers to form at least one polymer chain. In some cases the initiator can be part of the $R^1$, $R^2$, $R^5$, $X^1$ or $X^2$ and used for direct coupling, (e.g., initiation). Examples of initiator groups include primary alcohol linking group (e.g., a group having the formula $-(CH_2)_z-OH$, where z is an integer from 1 to about 25; or $-O-R^6-O-H$ where $R^6$ is alkylene, or alkenylene having at least two carbon atoms). Exemplary alcohol containing groups include hydroxymethyl, hydroxyethyl, hydroxypropyl, hydroxybutyl, $-O-CH_2CH_2-OH$ or ArOH, and the like. Polymer groups prepared from vinyl groups can use a radical forming linking group (e.g., a diazo or peroxy group). Other exemplary initiator groups include thiocarbonylthio compounds, such as dithioesters, dithiocarbamates, trithiocarbonates, xanthates, and the like.

The polymer chains can be formed using any compatible polymer synthesis method known in the art such as; 1) Nitroxide-mediated polymerization (NMP); 2) Reversible addition-fragmentation chain transfer (RAFT) polymerization using compounds having thiocarbonylthio initiator groups, such as dithioesters, dithiocarbamates, trithiocarbonates, and xanthates; 3) ATRP: using compounds having activated $RCH_2X$ initiator groups where X is a halogen (e.g., chlorine or bromine), α-haloesters such as α-bromobutyrolactone, allyl chloroacetate, vinyl chloroacetate, hydroxyethyl 2-bromobutyrate, t-butyl 2-bromobutyrate, glycidol 2-bromopropionate, and the like or α-haloamides such as 2-chloroacetamide and the like. Ring opening polymerization methods can use also compounds having alcohols or metal alkoxide, and carboxylic acid or metal carboxylate as initiator groups. Cationic polymerization methods can uses compounds having alkyl halide, tosylate, Lewis acid or alcohol initiator groups. Anionic polymerization reactions can use compounds having alcoholic or nucleophilic base initiator groups, such initiators for anionic polymerization are known in the art.

The invention includes dimers, e.g., compounds where $R^3$ and $R^4$ taken together with the $Y^1$ atom form a chelate ring having the formula:

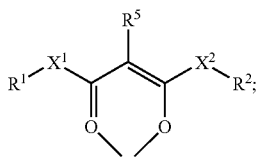

e.g., $R^3$ and $R^4$ form a ring together with the atom to which they are attached to provide a compound having formula III

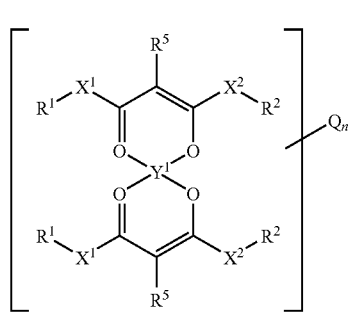

III where each $R^1$, $R^2$, $X^1$, $X^2$ and $R^5$ are independently selected from the definitions above. Additionally, $R^3$ and $R^4$ taken together form a bidentate chelate, such as deprotonated acid or diacid group, HOC(=O)CH$_2$C(=O)OH (malonic acid) or HOC(=O)CH$_2$C(=O)OH (oxalic acid), or chelating group such as acid-alcohol, acid-ether, with two donor groups, or $R^3$ and $R^4$ taken together with the boron atom form a ring having the formula:

Preferred $R^1$ and $R^2$ groups include phenyl, naphthyl, anthracyl or have the formula

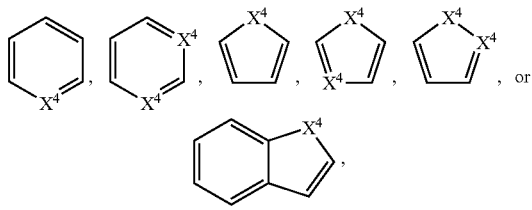

where each $X^4$ is independently O, S, NR$^a$, or PR$^a$, where R$^a$ is hydrogen, alkyl or aryl.

More preferred $R^1$ and $R^2$ groups include phenyl, naphthyl, anthracyl or have the formula:

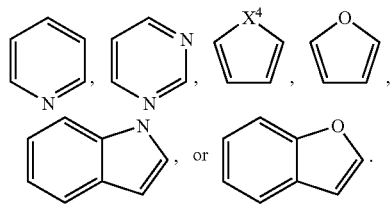

Even more preferred $R^1$ and $R^2$ groups include phenyl, or naphthyl.

Specific substituents include halo, hydroxy($C_1$-$C_{12}$)alkyl, halo($C_1$-$C_{12}$)alkyl, $R^{15}$O($C_1$-$C_{12}$)alkyl, $R^{15}$O($C_1$-$C_{12}$)alkyl-O—, —OR$^{15}$, —CO$_2$R$^{15}$, —OC(O)R$^{16}$, —C(O)R$^{16}$, —NR$^{13}$R$^{14}$, —N(R$^{23}$)C(O)R$^{24}$, —C(O)NR$^{17}$R$^{18}$, —SR$^{19}$, or —SO$_2$R$^{20}$.

Preferred $R^3$ and $R^4$ substituents include electron withdrawing groups such as halo, e.g., fluorine.

Preferred $R^3$ and $R^4$ substituents include electron donating group such as OR$^{15}$.

The polymeric luminescent dye compounds and compositions can be processed into materials that can be combined in medical devices such as oxygen sensors. The sensors can be used to detect low levels of oxygen in, e.g., blocked vasculature, hypoxic tumors.

Diketone synthesis is modular. Different $R^1$ and $R^2$ groups may be added to either side of the diketone to modulate optical properties (e.g., luminophores). Additionally, the $R^1$ and $R^2$ can contain a linker group (e.g. initiator, terminating agent, coupling partner) or a group that can be readily converted using standard chemical techniques to an initiator site. Various commercially available starting compounds that have initiator sites may be readily used or modified to form compounds having formula I. The compounds having formula II can be modified to tune polymer architecture, materials and optical properties. Block copolymers can be also prepared, by sequential monomer addition or by modifying dibenzoylmethane and related diketones with two different kinds of initiator sites. These can self assemble to generate nanostructured films, bulk materials, solution assemblies, particles, etc. Other polymer compositions can be also prepared, e.g., by varying the initiator group. A preferred initiator group for lactide or caprolactone ring opening polymerizations is a primary alcohol. Alpha bromoesters are good initiator groups for ATRP, affording PMMA and other polymers. The diketone ligand molecules can be readily prepared using standard methods known to a person skilled in organic synthesis. In addition many ligands are commercially available and have groups that can be used or transformed into initiator groups. Exemplary ligand molecules include molecules having the formulas below:

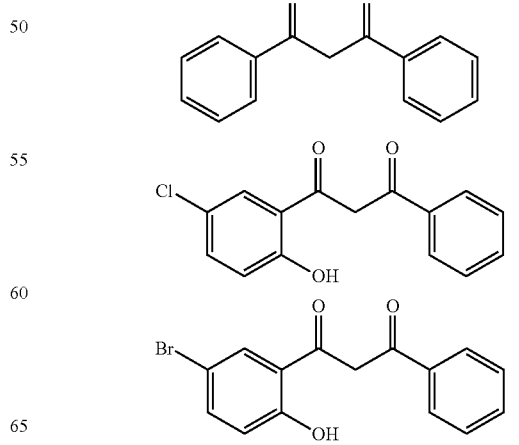

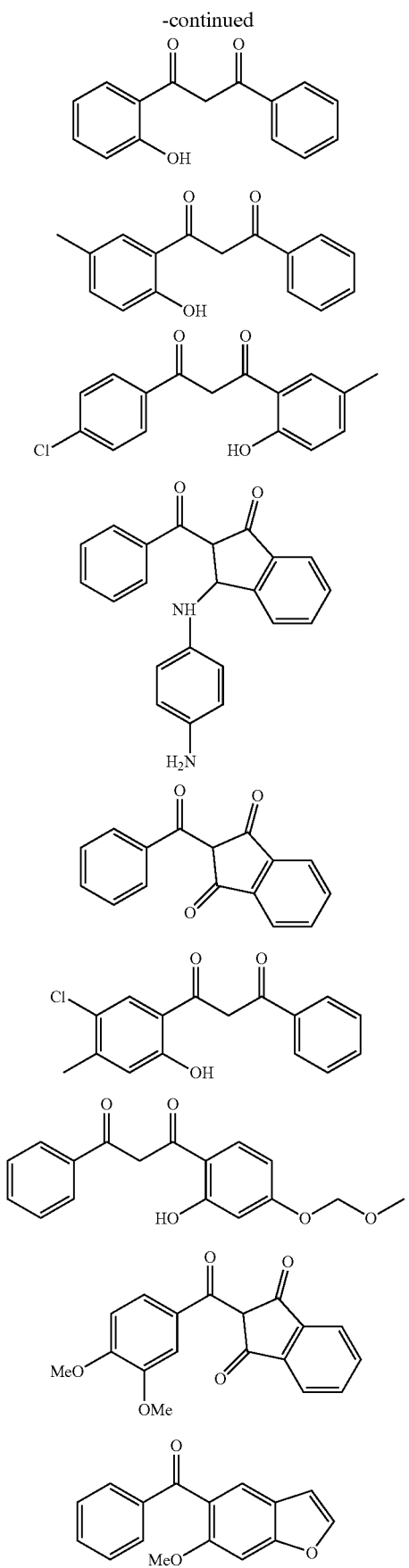
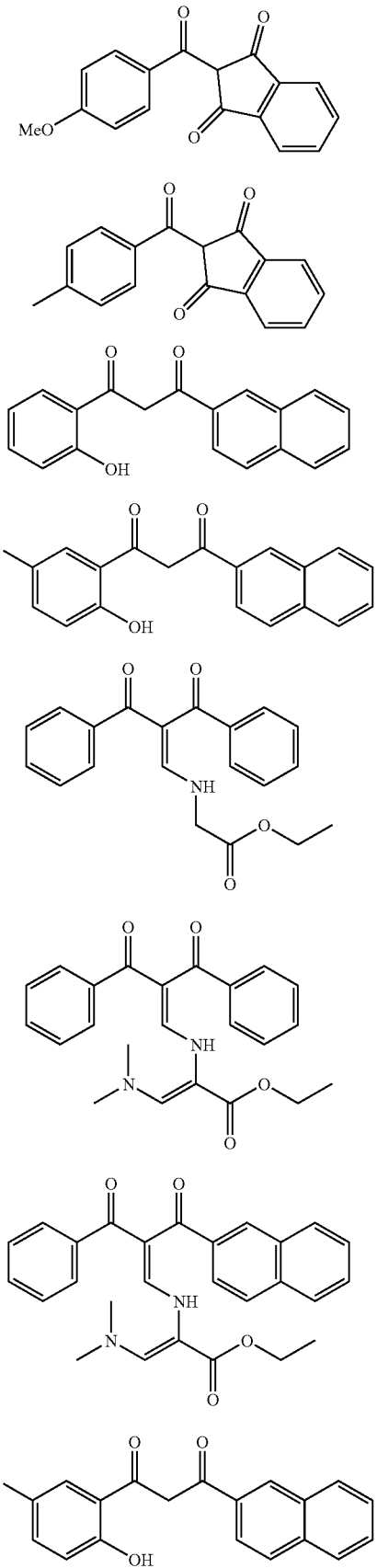

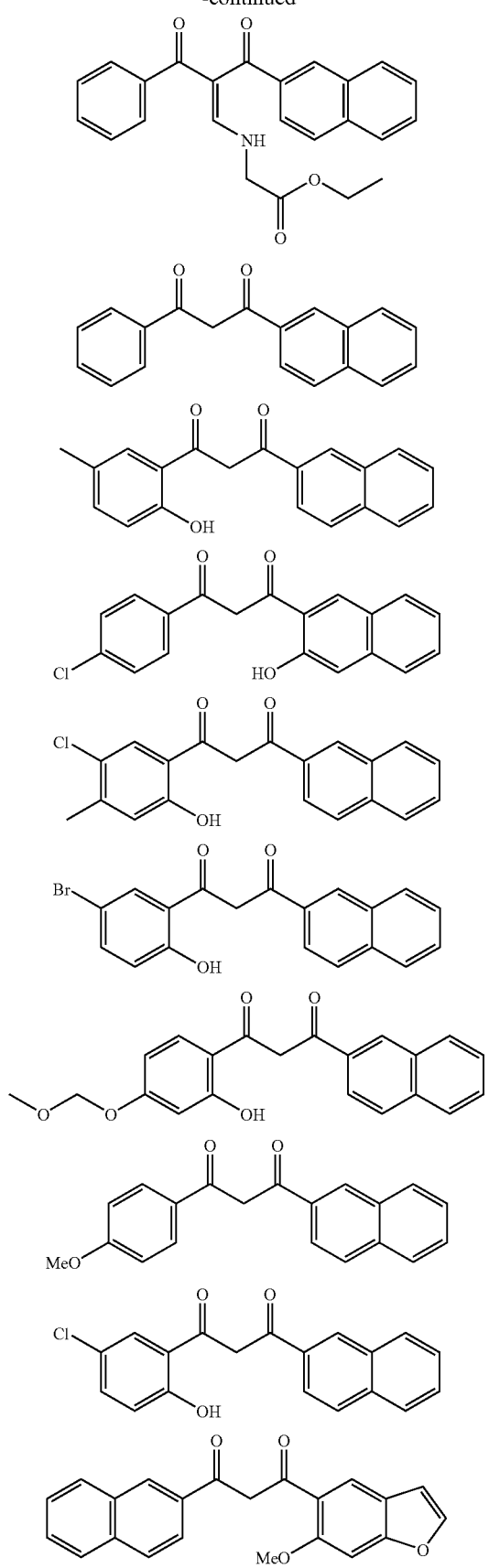
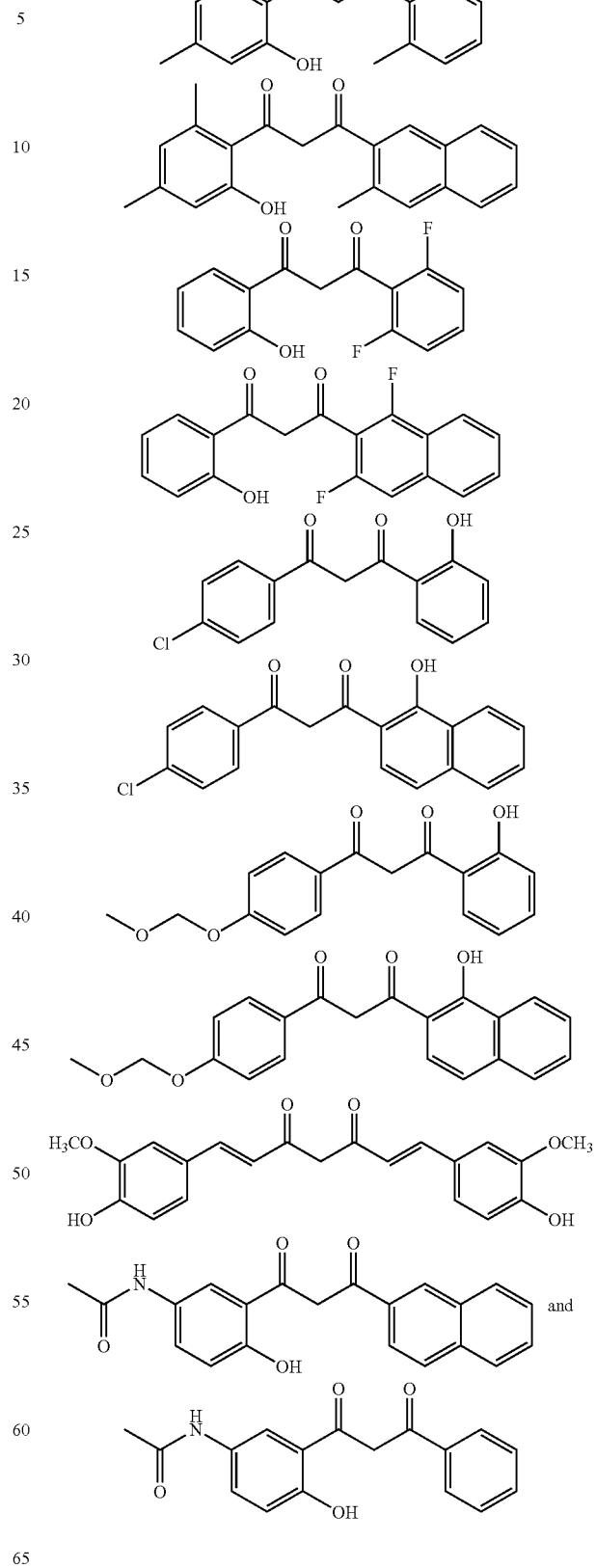
Synthesis of the boron polymer, BF$_2$dbmPLA, begins with hydroxylfunctionalized difluoroboron dibenzoylmethane.

BF$_2$dbmOH (1), is prepared for use as an initiator in the ring opening polymerization of lactide to produce BF$_2$dbm end-functionalized polylactide, BF$_2$dbmPLA (2) (FIG. 1). The boron complex, BF$_2$dbmOH, 1, is synthesized from dbmOH (21) and BF$_3$.Et$_2$O in CH$_2$Cl$_2$ (60° C., 1 hour). After purification by recrystallization from acetone/hexanes, air stable, bright yellow needles are obtained in good yield (75%). The boron polymer, BF$_2$dbmPLA, 2, is generated from BF$_2$dbmOH and DL-lactide using tin octoate, Sn(oct)2, as the ROP catalyst under solvent-free conditions (1:lactide:Sn (oct)$_2$=1:200:1/50) with heating at 130° C. under nitrogen. The reaction is stopped after 1.5 hours (~50% monomer conversion) to avoid broader molecular weight distributions (i.e. higher PDIs) noted for longer reaction times, suggestive of transesterification and thermal depolymerization. After purification by precipitation from CH$_2$Cl$_2$/cold MeOH and CH$_2$Cl$_2$/hexanes, a pale greenish yellow polymer is obtained (75% yield, corrected for monomer consumption). Molecular weight data determined by gel permeation chromatography (GPC) and $^1$H NMR spectroscopy are in good agreement: Mn(GPC/RI)=8,800, PDI=1.09; Mn (NMR)=8,600. Furthermore, key proton resonances associated with the boron dbm end group are evident and shifted as compared to the initiator 1 (e.g. BF$_2$dbmOCH$_2$CH$_2$OR: R=H, 4.04 ppm; R=PLA, 4.32 ppm). The synthesis is illustrated in FIG. 1.

EXAMPLES

Materials. 3,6-Dimethyl-1,4-dioxane-2,5-dione (D,L-lactide, Aldrich) was recrystallized twice from ethyl acetate and stored under nitrogen. Solvents, CH$_2$Cl$_2$ and THF, were dried and purified by passage through alumina columns. Tin(II) 2-ethylhexanoate (Sn(oct)$_2$, Spectrum), boron trifluoride diethyl etherate (Aldrich, purified, redistilled) and all other reagents and solvents were used as received without further purification.

Methods. $^1$H NMR (300 MHz) spectra were recorded on a UnityInova 300/51 instrument in CDCl$_3$ unless indicated otherwise. $^1$H NMR spectra were referenced to the signal for residual protio chloroform at 7.26 ppm and coupling constants are given in hertz. UV/vis spectra were recorded on a Hewlett-Packard 8452A diode-array spectrophotometer. Fluorescence spectra were measured on a Spex Fluorolog 2+2 spectrofluorometer. Molecular weights were determined by GPC (THF, 20° C., 1.0 mL/min) vs polystyrene standards with RI and UV/vis detection (λ=396 nm), and a correction factor of 0.58 was applied to all data. Reported yields are corrected for monomer consumption. Polymer Labs 5 μm mixed-C columns along with Hewlett-Packard instrumentation (Series 1100 HPLC) and Viscotek software (TriSEC GPC Version 3.0, Viscotek Corp) were used in the GPC/RI or GPC/UV analysis. Elemental analysis was performed by Atlantic Microlab, Inc., Norcross, Ga.

Preparation 1: DbmOH (1-(4-(2-hydroxyethoxy)phenyl)-3-phenylpropane-1,3-dione)

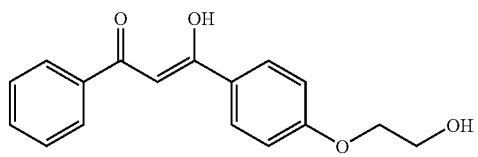

DbmOH was prepared as previously reported by Bender et al. *J. Am. Chem. Soc.* 2002, 124, 8526-8527. with the following modifications. After purification of the crude product (3 g) by column chromatography, the solid was dissolved in hot 60:40 hexanes/EtOAc, sonicated briefly (~3-5 sec) until crystallization commenced, then the flask was allowed to cool to room temperature (~2 h), then further cooled in the freezer (−15° C.; ~12 h). The solid was collected by filtration, washed with cold 60:40 hexanes/EtOAc (~5 mL) and dried in vacuo to give bright yellow needles with a greenish hue 1.8 g (first crop). The mother liquor was concentrated to give pale yellow solid, which was re-subjected to the aforementioned crystallization procedure: 0.63 g (second crop; larger needles). Yield: 2.4 g (80%).

Preparation 2: BF$_2$dbmOH (1)

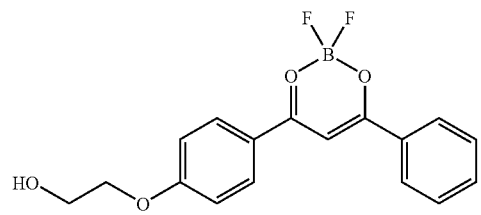

DbmOH (100.0 mg, 0.352 mmol) was added to a flame-dried 2-neck round bottom flask under nitrogen, and dissolved in CH$_2$Cl$_2$ (15 mL) to give a pale yellow solution. Boron trifluoride diethyl etherate (44 μL, 0.352 mmol) was added via syringe and the solution turned bright yellow. The flask was equipped with a reflux condenser and heated in an oil bath at 60° C. (1 h). The solution was cooled to room temperature and the solvent was removed on vacuo, giving a yellow foam. The crude product was recrystallized in 10:90 acetone:hexanes to give BF$_2$dbmOH as bright yellow needles: 87 mg (75%). $^1$H NMR (CDCl$_3$) δ 8.15 (m, 4H, 2',6'-ArH, 2",6"-ArH), 7.68 (t, J=7.3, 1H, 4'-ArH), 7.55 (t, 2H, J=7.6, 3",5"-ArH), 7.07 (d, J=9.1, 2H, 3',5'-ArH), 7.12 (s, 1H, COCHCO), 4.23 (t, J=4.5, 2H, HOCH$_2$CH$_2$OAr), 4.04 (t, J=4.4, 2H, HOCH$_2$CH$_2$OAr), 1.96 (t, J=6.2, 1H, HOCH$_2$CH$_2$OAr). M.p. 170-172° C. Anal. calcd for C$_{17}$H$_{15}$BF$_2$O$_4$: C, 61.48; H, 4.55. Found: C, 61.72; H, 4.63. UV/vis (CH$_2$Cl$_2$): λ$_{max}$(sh) 397 nm, ε=53,000 M$^{-1}$cm$^{-1}$.

Example 1

Preparation of BF$_2$dbmPLA Polymer

BF$_2$dbmOH (10 mg, 0.030 mmol), lactide (0.865 g, 6.00 mmol) and Sn(oct)$_2$ (0.24 mg, 0.60 μmol) (loading: 1:200:1/50) in hexanes were combined in a sealed Kontes flask under N$_2$. The entire bulb of the flask was submerged in a 130° C. oil bath for 1.5 h. Crude polymer was purified by precipitation from CH$_2$Cl$_2$/cold MeOH. The polymer was collected by centrifugation, the filtrate was decanted, and the gummy solid was washed with additional cold MeOH (2×). The resulting solid was reprecipitated from CH$_2$Cl$_2$/hexanes, collected by centrifugation, washed with hexanes (2×), and dried in vacuo to give a very pale greenish yellow foam: 320 mg (75%, corrected for 49.5% monomer conversion). M$_n$ (GPC/RI)=8, 800, PDI=1.09; M$_n$ (NMR)=8,600. $^1$H NMR (CDCl$_3$) δ 8.16 (t, J=8.2, 4H, 2',6'-ArH, 2",6"-ArH), 7.69 (t, J=7.6, 1H, 4'-ArH), 7.57 (m, 2H, 3",5"-ArH), 7.12 (s, 1H, COCHCO), 7.04 (d, J=8.5, 2H, 3',5'-ArH), 5.12-5.30 (m, broad, 119H, PLA CH), 4.54 (d, J=4.9, 2H, CH$_2$CH$_2$OAr), 4.32 (m, 2H, CH$_2$CH$_2$OAr), 2.70 (s, broad, 1H, PLA OH), 1.54-1.60 (m, broad, 361H, PLA CH$_3$). Uv/vis (CH$_2$Cl$_2$): $\lambda_{max}$(sh)=396 nm, $\epsilon$=50,100 M$^{-1}$cm$^{-1}$. T$_g$=52° C. T$_d$=298° C.

Examples 2-8

Preparation of BF$_2$dbmPLA Polymers

BF$_2$dbmPLA (2-7). BF2dbmOH (10.0 mg, 0.0300 mmol), lactide (0.865 g, 6.00 mmol) and Sn(oct)$_2$ (0.24 mg, 0.6 μmol) (loading: 1:200:1/50) in hexanes were combined in a sealed Kontes flask under N$_2$. The entire bulb of the flask was submerged in a 130° C. oil bath. The reaction was stopped at 15 min, 20 min, 50 min, 1.5 hours, 2.5 hours, and 16 hours. Crude polymer was purified by precipitation from CH$_2$Cl$_2$/cold MeOH. The polymer was collected by centrifugation, the filtrate was decanted, and the gummy solid was washed with additional cold MeOH (2×). The resulting solid was reprecipitated from CH$_2$Cl$_2$/hexanes, collected by centrifugation, washed with hexanes (2×), and dried in vacuo to give a greenish yellow foam (the color of the foam tends to be paler when MW increases).

Physical Characterization of Polymers 2-8:

(2) M$_n$ (GPC/RI)=8,800, PDI=1.09; M$_n$ (NMR)=8,600. $^1$H NMR (CDCl$_3$) δ 8.16 (t, J=8.2, 4H, 2',6'-ArH, 2'',6''-ArH), 7.69 (t, J=7.6, 1H, 4'-ArH), 7.57 (m, 2H, 3'',5''-ArH), 7.12 (s, 1H, COCHCO), 7.04 (d, J=8.5, 2H, 3',5'-ArH), 5.12-5.30 (m, broad, 119H, PLA CH, 4.54 (d, J=4.9, 2H, CH$_2$CH$_2$OAr), 4.32 (m, 2H, CH$_2$CH$_2$OAr), 2.70 (s, broad, 1H, PLA OH), 1.54-1.60 (m, broad, 361H, PLA CH$_3$). UV/vis (CH$_2$Cl$_2$): $\lambda_{max}$(sh)=396 nm, $\epsilon$=50,100 M$^{-1}$cm$^{-1}$. T$_g$=52° C. T$_d$=298° C.

(3) 36.0 mg (32%, corrected for 13% monomer conversion). M$_n$ (GPC/RI)=3,000, PDI=1.10; M$_n$ (NMR)=3,000. NMR data similar to above. UV/vis (CH$_2$Cl$_2$): $\lambda_{max}$(sh)=396 nm, $\epsilon$=52,700 M$^{-1}$cm$^1$.

(4) 58.7 mg (40%, corrected for 17% monomer conversion). M$_n$ (GPC/RI)=4,500, PDI=1.06; M$_n$ (NMR)=5,000. NMR data similar to above. UV/vis (CH$_2$Cl$_2$): $\lambda_{max}$(sh)=396 nm, $\epsilon$=51,800 M$^{-1}$cm$^{-1}$.

(5) 200.1 mg (68%, corrected for 34% monomer conversion). M$_n$ (GPC/RI)=7,000, PDI=1.11; M$_n$ (NMR)=6,800. NMR data similar to above. UV/vis (CH$_2$Cl$_2$): $\lambda_{max}$(sh)=396 nm, =50,300 M$^{-1}$cm$^{-1}$.

(6) 359.0 mg (83%, corrected for 50% monomer conversion). M$_n$ (GPC/RI)=10,600, PDI=1.09; M$_n$ (NMR)=8,600. NMR data similar to above. UV/vis (CH$_2$Cl$_2$): $\lambda_{max}$(sh)=396 nm, $\epsilon$=51,000 M$^{-1}$cm$^{-1}$.

(7) 492.7 mg (89%, corrected for 64% monomer conversion). M$_n$ (GPC/RI)=14,900, PDI=1.10; M$_n$ (NMR) Not available due to weak initiator signal. UV/vis (CH$_2$Cl$_2$): $\lambda_{max}$ (sh)=396 nm, $\epsilon$=49,100 M$^{-1}$cm$^{-1}$.

(8) 737.5 mg (87%, corrected for 98% monomer conversion). M$_n$ (GPC/RI)=22,600, PDI=1.66; M$_n$ (NMR) Not available due to weak initiator signal. UV/vis (CH$_2$Cl$_2$): $\lambda_{max}$ (sh)=396 m, $\epsilon$=46,300 M$^{-1}$cm$^{-1}$.

Example 9

Film Preparation

BF$_2$dbmPLA (2-3 mg) of sample 2 was dissolved in CH$_2$Cl$_2$ (2 mL) to give a homogenous solution. One drop of the solution was withdrawn via a pipet and was cast on the surface of a quartz luminescent cuvet to form a very thin film. The film was allowed to dry for ~10 min in air (RT) before taken to measurement of molecular weight effects on emission properties. (The Same procedure was followed for samples 3-8.)

Summary of BF$_2$dbmOH Initiator and BF$_2$dbmPLA Polymer Properties.

The optical properties of the boron initiator BF$_2$dbmOH and polymer 2 prepared in Example 1, were investigated in solution and in the solid state. UV/vis spectroscopic data for BF$_2$dbmPLA in CH$_2$Cl$_2$ solution ($\lambda_{max}$=396 nm, $\epsilon$=50,100 M$^{-1}$cm$^{-1}$) are similar to the boron initiator 1 ($\lambda_{max}$=397 nm, $\epsilon$=53,000 M$^{-1}$cm$^{-1}$) and show high molar absorptivities characteristic of this family of compounds. Upon excitation with a UV lamp (long wavelength setting; excitation wavelength ~365 nm) intense blue fluorescence is observed for CH$_2$Cl$_2$ solutions of BF$_2$dbmOH and BF$_2$dbmPLA ($\lambda_{em}$~440 nm), and in both cases fluorescence quantum yields, $\phi_F$, are very high (~90-95%). (Compare to BF$_2$ compounds of dbm, 20%, and 1,3-di(4-methoxyphenyl)propane-1,3-dione, 85%). Solutions appear blue even in ambient light or upon when illuminated with a flashlight, due to near UV excited fluorescence. In the solid state, in contrast, BF$_2$dbmOH crystals display greenish yellow emission ($\lambda_{em}$=540 nm) that is sensitive to the solid form. (Powders emit at ~512 nm). Fluorescence lifetimes for the initiator and polymer (solution, solid state) are all in the nanosecond range and fit to single-exponential decay, further verifying sample homogeneity. Boron polymer foams (i.e. obtained after precipitation and drying) and thin films cast from dilute CH$_2$Cl$_2$ solution also show blue fluorescence (~440 nm, FIG. 2), but lifetimes fit to double exponential decay. Two photon absorption was also confirmed for the BF$_2$dbmPLA foam via laser scanning confocal microscopy with femtosecond Ti:sapphire laser excitation ($\lambda_{ex}$=790 nm). Samples (e.g. powders, nanoparticles) continue to emit strongly even after months in aqueous suspension.

Figure 2:
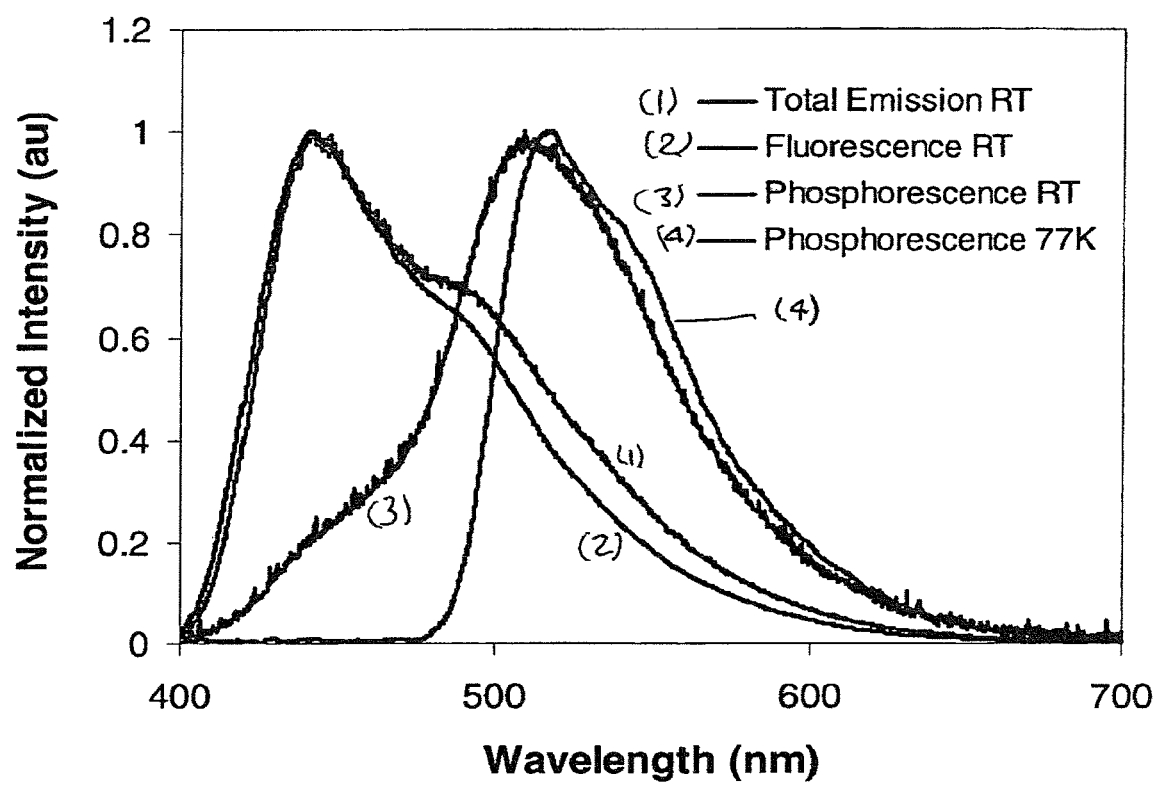
FIG. 2 shows normalized emission spectra for a BF$_2$dbmPLA thin film including total emission, fluorescence, phosphorescence with delayed fluorescence, and phosphorescence at low temperature.
Figure 3:
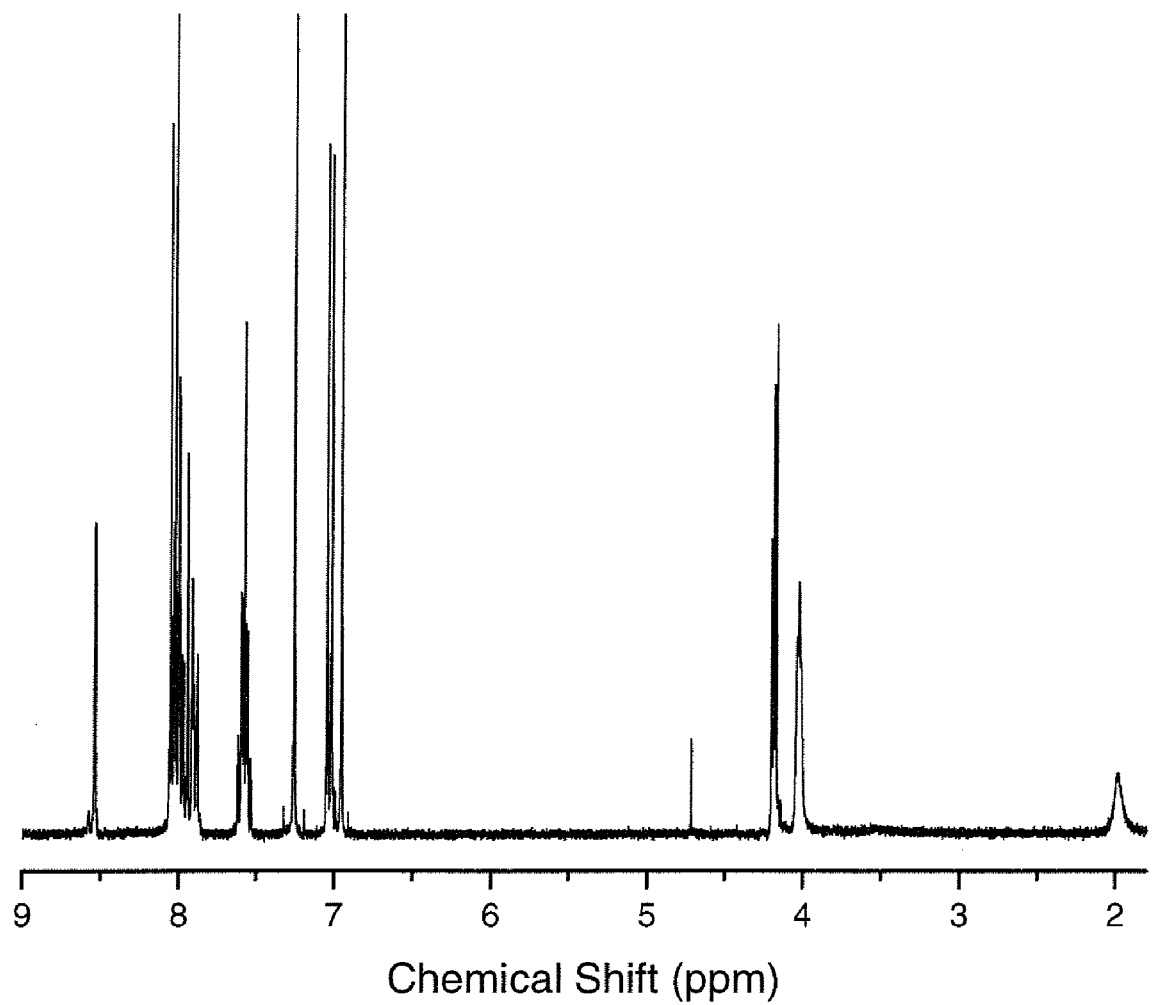
FIG. 3 is a $^1$NMR spectrum of nmbOH.

The BF$_2$dbmPLA polymer also exhibits long lived, green room temperature phosphorescence (RTP). The phosphorescence is sensitive to oxygen quenching, serving as a highly sensitive optical oxygen sensor. Films also exhibit delayed fluorescence, a small shoulder on the high energy side of the phosphorescence emission band, which is temperature sensitive and disappears at 77 K (FIG. 2).

Properties of BF$_2$dbmPLA materials vary with polymer molecular weight. BF$_2$dbmPLA polymers of molecular weights ranging from ~2-20 kDa all exhibit high quantum yields ranging from ~75-90%. All methylene chloride solutions display intense blue fluorescence (~440 nm), however in the solid state (films, powders, etc.) BF$_2$dbmPLA emission varies from green to blue, depending on the polymer molecular weight. This provides a very simple method of tuning emission color in dye-polymer conjugates.

Example 10

BF$_2$dbmOH/PLA Blends

PLA (Control). Ethylene glycol (5.74 mg, 92.4 μmol), lactide (0.866 g, 6.00 mmol) and Sn(Oct)$_2$ (1.50 mg, 3.70 μmol) (Loading 1:65:1/25) in hexanes were combined in a sealed Kontes flask under N$_2$. The entire bulb of the flask was submerged in a 130° C. oil bath for 20 min. Crude polymer was purified by precipitation from CH$_2$Cl$_2$/cold MeOH (to remove unreacted monomer). The polymer was collected by centrifugation, the filtrate was decanted, and the gummy solid was washed with additional cold MeOH (2×). The resulting solid was reprecipitated from CH$_2$Cl$_2$/hexanes (to remove the Sn catalyst), collected by centrifugation, washed with hexanes (2×), and dried in vacuo to give a white foam: 0.66 g (84%, corrected for 92% monomer conversion). $M_n$(GPC/RI)=8,800, PDI: 1.09; $M_w$(GPC/MALLS)=9,400, PDI=1.03. $M_n$ (NMR)=8,900. $^1$H NMR (CDCl$_3$) δ $^1$H NMR (CDCl$_3$) 5.11-5.30 (125H, m, broad, CH), 4.33 (4H, m, CH$_2$CH$_2$), 2.69 (m, 2H, OH), 1.54-1.60 (373H, m, broad, CH$_3$).

BF$_2$dbmOH/PLA Blend—Film Preparation.

PLA was dissolved in 10 mL CH$_2$Cl$_2$ and different amount of BF$_2$dbmOH was were added to the solution to form different fluorophore percentages (F %) in the blend. The solution then was slowly swirled to dry under N$_2$ to provide films on the wall of the vial.

TABLE 1

| Sample No. | BF2dbmOH | PLA | F % |
|---|---|---|---|
| 9 | 2.1 mg | 25 mg | 8.3 |
| 10 | 3.2 mg | 50 mg | 6.4 |
| 11 | 2.1 mg | 50 mg | 4.3 |
| 12 | 1.3 mg | 50 mg | 2.7 |
| 13 | 1.0 mg | 50 mg | 2.0 |
| 14 | 0.6 mg | 100 mg | 0.6 |

BF$_2$dbmOH/PLA Blend—Film Properties.

Intense blue fluorescence is observed for BF$_2$dbmOH/PLA blends cast as films. Under oxygen free conditions, green phosphorescence is also observed. Fluorescence emission color can be tuned (e.g. from blue to green), by varying the dye loading in the film.

Example 11

Preparation of BF$_2$dbmPLA Polymer Fiber

A polymer fiber (~10 inches) was drawn from the crude reaction mixture prepared in example 1 using a glass pipet. When one end of the fiber is excited using UV lamp ($\lambda_{ex}$=365 nm, RT, air), the excited end of the fiber emits blue light, which passes through and along part of the fiber. The far end of the fiber that is outside the range of the UV light source emits light that is red shifted and green color. This is also noted when excitation is performed with a pulsed nitrogen laser ($\lambda_{ex}$=337 nm).

Example 12

Preparation of BF$_2$dbmPLLA

BF$_2$dbmOH (10.0 mg, 0.034 nmol, 1 eq), L-lactide (0.49 g, 3.40 mmol 100 eq.) and Sn(Oct)2 (0.55 mg, 0.0014 mmol, 1/50 eq.) in hexanes were combined in a sealed Kontes flask under N$_2$. The entire bulb of the flask was submerged in a 130° C. oil bath (to prevent the monomer from solidifying on the upper walls of the flask) for 2.5 hours. Crude polymer was purified by precipitation from CH$_2$Cl$_2$/cold MeOH (to remove unreacted monomer). The polymer was collected by centrifugation, the filtrate was decanted, and the powdery solid was washed with additional cold MeOH (2×). The resulting solid was reprecipitated from CH$_2$Cl$_2$/hexanes (to remove the Sn catalyst), collected by centrifugation, washed with hexanes (2×), and dried in vacuo to give a pale green powder (0.37 g, 75%). GPC data: $M_n$ 11,000; PDI: 1.09.

Example 13

Preparation of BF$_2$dbmPCL

BF$_2$dbmOH (20.0 mg, 0.068 mmol), ε-caprolactone (1.55 g, 13.6 mmol) and Sn(Oct)$_2$ (0.55 mg, 0.0014 mmol) in hexanes were combined in a sealed Kontes flask under N$_2$. The entire bulb of the flask was submerged in a 110° C. oil bath for 36 h. Crude polymer was purified by precipitation from CH$_2$Cl$_2$/cold MeOH (to remove unreacted monomer). The polymer was collected by centrifugation, the filtrate was decanted, and the gummy solid was washed with additional cold MeOH (2×). The resulting solid was reprecipitated from CH$_2$Cl$_2$/hexanes (to remove the Sn catalyst), collected by centrifugation, washed with hexanes (2×), and dried in vacuo to give a white powder (1.25 g, 86%). GPC (THF): $M_n$: 18,400; PDI: 1.08

Example 14

Preparation of BF$_2$dbmPCL-b-PLA

BF$_2$dbmPCL (1.0 g, 0.054 mmol), D,L-Lactide (2.161 g, 14.85 mmol) and Sn(Oct)$_2$ (0.49 mg, 0.0011 mmol) in hexanes were combined in a sealed Kontes flask under N$_2$. The entire bulb of the flask was submerged in a 130° C. oil bath for 5.5 hours. Crude polymer was purified by precipitation from CH$_2$Cl$_2$/cold MeOH (to remove unreacted monomer). The polymer was collected by centrifugation, the filtrate was decanted, and the powder like solid was washed with additional cold MeOH (2×). The resulting solid was reprecipitated from CH$_2$Cl$_2$/hexanes (to remove the Sn catalyst), collected by centrifugation, washed with hexanes (2×), and dried in vacuo to give a pale green solid (1.25 g, 86%). GPC Data: $M_n$: 41,600; PDI: 1.12

Example 15

Preparation of BF$_2$dbmPMMA

A preliminary experiment was performed with dbmPMMA and BF$_3$ in CH$_2$Cl$_2$ solution. The resulting white polymer exhibited intense blue light emitting property under UV light ($\lambda_{ex}$=365 nm). This suggests that B polymeric complexes may also be prepared by the chelation method, with preformed dbm ligand-containing polymer.

Example 16

Preparation of nmbOH

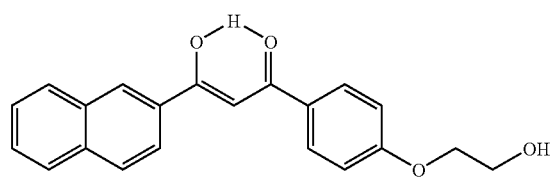

1-(4-(2-(tetrahydro-2H-pyran-2-yloxy)ethoxy)phenyl) ethanone (2.00 g, 7.57 mmol) and 2-methyl naphthoate (2.11 g, 11.36 mmol) were added to a 25 mL flame dried Schlenk flask under N$_2$. 10 mL THF was added to dissolve the mixture under Ar. NaH (0.272 g, 11.36 mmol) was added to a 100 mL 2-necked round-bottom flask under N$_2$, and 30 mL THF was added to the flask under Ar. The mixture from the Schlenk flask was transferred via cannula to the round-bottom flask containing a suspension of NaH/THF. The mixture in the flask was stirred at room temperature for 10 min before adding a condenser to the round-bottom flask under N$_2$. Then the bulb of the flask was submerged in an oil bath at 45° C. for 2.5 h.

Figure 4:
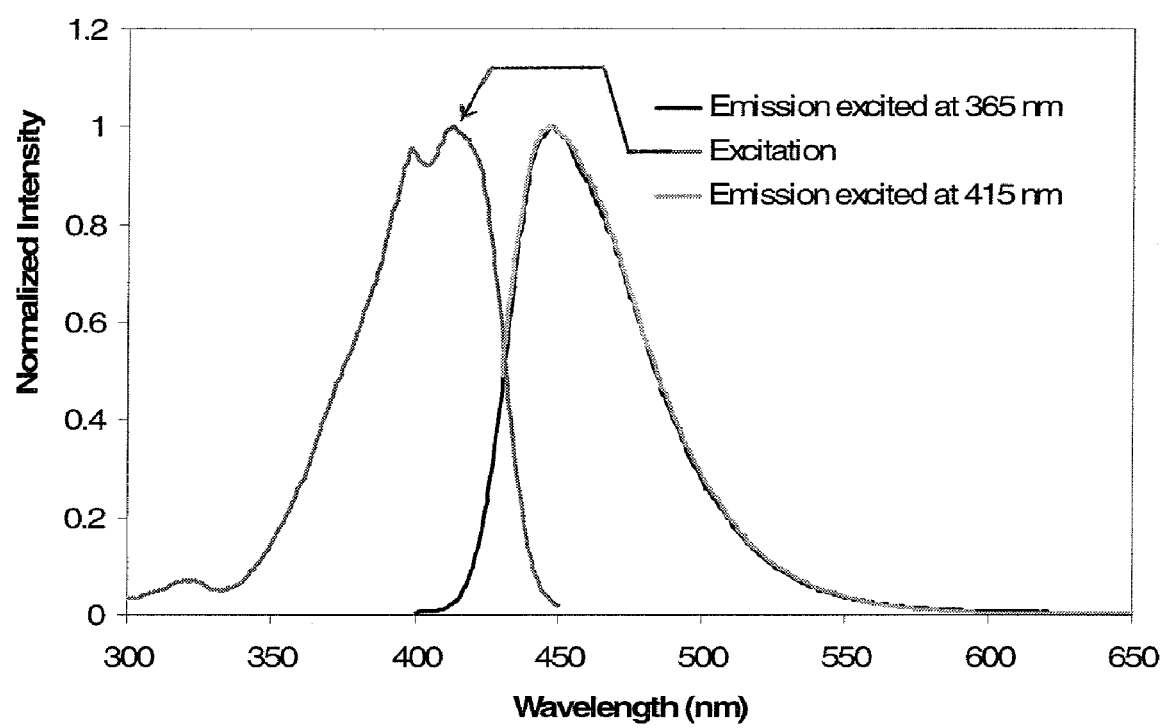
FIG. 4 illustrates the excitation and emission spectra of BF$_2$nbmOH.

The maroon reaction mixture was cooled to room temperature and was neutralized with saturated NaHCO$_3$ aqueous solution. The mixture was extracted with EtOAC (50 mL×2) and brine (100 mL) was added to the combined organic layers. The collected organic solution was dried over Na$_2$SO$_4$ and was filtered by a gravity funnel. The solution was dried in vacuo for 16 h to result in viscous dark maroon oil. Acetic acid (30 mL), THF (30 mL) and water (10 mL) were added to a 500 mL flask containing the oil. The flask was submerged in an oil bath at 45° C. for 36 h. Then the reaction mixture was dried in vacuo and HCl (250 mL 1M) was added to the 500 mL flask. Orange precipitate was formed and was collected by gravity filtration. The precipitate was dried in vacuo for 15 h and the crude product was obtained by separating the precipitate from a silica gel column using 60:40 hexanes/acetone as the solvent. The collected desired component was dried in vacuo and was recrystallized from 60:40 hexanes/EtOAc to give silver metallic looking snow-flake like crystals. (1.14 g, 52%) Anal. calcd for C$_{21}$H$_{18}$O$_4$: C, 75.43; H, 5.43; O, 19.14. Found: C, 75.47; H, 5.41; O, 19.21. m.p.=136-137° C. UV/vis (CH$_2$Cl$_2$): $\lambda_{max}$(sh)=365 nm, $\epsilon$=53,600 M$^{-1}$cm$^{-1}$. The $^1$H NMR spectrum is illustrated in FIG. 4.

Example 17

Preparation of BF$_2$nmbOH

NbmOH (500.0 mg) was added to a flame-dried 2-neck round bottom flask under nitrogen, and dissolved in CH$_2$Cl$_2$ (15 mL) to give a pale yellow solution. Boron trifluoride diethyl etherate (40 µL) was added via syringe and the solution turned bright yellow. The flask was equipped with a reflux condenser and heated in an oil bath at 60° C. (1 h). The solution was cooled to room temperature and the solvent was removed on vacuo. The crude product was recrystallized is 10:90 acetone:hexane to give BF$_2$nbmOH as dark yellow needles: 401 mg (72%). Anal. calcd for C$_{21}$H$_{17}$O$_4$BF$_2$: C, 66.21; H, 4.48; Found: C, 66.40; H, 4.54. $\lambda_{max}$(sh)=415 nm, $\epsilon$=52,100 M$^{-1}$cm$^{-1}$. The excitation and emission spectra in CH$_2$Cl$_2$($\lambda_{ex}$=415 nm and $\lambda_{em}$=446 mm) are illustrated in FIG. 4.
BF$_2$nbmPLA (First Batch GZ1-174 April 16$^{th}$)

Examples 18

Preparation of BF$_2$nbmPLA Polymer

BF2nbmOH (10.0 mg, 0.262 mmol), lactide (0.5655 g, 3.92 mmol) and Sn(oct)$_2$ (0.21 mg, 0.52 µmol) (loading: 1:150:1/50) in hexanes were combined in a sealed Kontes flask under N$_2$. The entire bulb of the flask was submerged in a 130° C. oil bath (to prevent the monomer from solidifying on the upper walls of the flask) for ~2 h. Crude polymer was purified by precipitation from CH$_2$Cl$_2$/cold MeOH to remove unreacted monomer. The polymer was collected by centrifugation, the filtrate was decanted, and the gummy solid was washed with additional cold MeOH (2×). The resulting solid was reprecipitated from CH$_2$Cl$_2$/hexanes to remove the Sn catalyst, collected by centrifugation, washed with hexanes (2×), and dried in vacuo to give a bright yellow foam: 168 mg (63%, corrected for 48% monomer conversion). M$_n$ (GPC/RI)=8,600, PDI=1.11; Mn (NMR)=8,730; λmax(sh)=414 nm, $\epsilon$=27,000 M−1cm−1.

Examples 19

BF$_2$nbmOH Initiator and BF$_2$nbmPLA Polymer Properties

BF$_2$ nm bOH also exhibits a high UV/vis extinction coefficient (~52,100 M$^{-1}$cm$^{-1}$) at $\lambda_{max}$=415 nm, and a strong fluorescence emission at 446 nm. UV/vis absorption spectral data for BF$_2$nbmPLA are as follows: λmax(sh)=414 nm, $\epsilon$=27,000 M$^{-1}$cm$^{-1}$, and intense blue fluorescence at ~450 nm is observed. Under a nitrogen atmosphere, BF$_2$nbmPLA material also displays long-lived greenish-yellow phosphorescence (~540 nm) after excitation and short-lived fluorescence ceased. Surprisingly, this material also displays phosphorescence even for films under air. When a vial was coated with a thin film and sealed under air, excitation revealed the expected fluorescence but after the lamp was turned off, phosphorescence gradually appeared too. Oxygen in the film may be depleted by phosphorescence quenching, generating a reactive singlet oxygen byproduct by photoactivation. Once depleted of quencher, films may phosphoresce until new oxygen quencher can diffuse into the film. In this way, these materials can serve as oxygen scavengers and activators, and optical reporters of gas diffusion rates even under ambient conditions. It is possible to tune the color of the fluorescence and phosphorescence by varying the polymer molecular weight. Materials also display different emission colors at different temperatures, which are also polymer molecular weight dependent.

Example 20

Preparation of B(dbmOH)$_2$Br

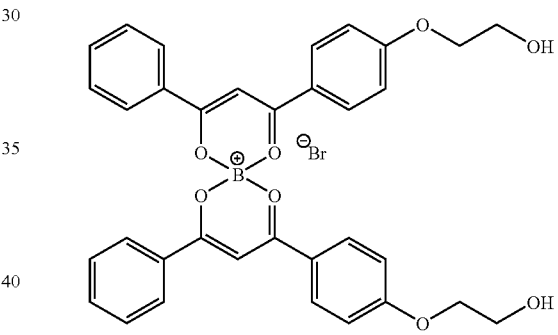

DbmOH (200 mg, 0.703 mmol) was dissolved in dry CH$_3$CN (5 mL) in a flame-dried 2-neck round bottom flask equipped with a condenser under N$_2$. The flask was submerged in an ice bath for 15 min, then BBr$_3$ (88.1 mg, 33 µL/0.351 mmol) was injected via a Hamilton syringe and the mixture stirred in the ice bath for 5 min. The flask was then removed from the ice bath, warmed to RT, and acetone was added to form a yellow precipitate. The crude product was collected by gravity filtration, washed with acetone, and dried in vacuo, then recrystallized from CH$_3$CN/acetone to form a deep yellow powder: 151 mg, 74%. UV/vis (EtOH): $\lambda_{max}$=426 nm; $\epsilon$=52,300 M$^{-1}$cm$^{-2}$.
Properties The UV/vis spectrum for B(dbmOH)$_2$Br in EtOH shows $\lambda_{max}$=426 nm. In 4:1 MeOH:EtOH, the emission exhibits dramatic color changes with temperature, ranging from blue at room temperature to green, orange, red, orange, greenish yellow as the sample is progressively cooled and forms a glass at 77 K.

Figure 5:
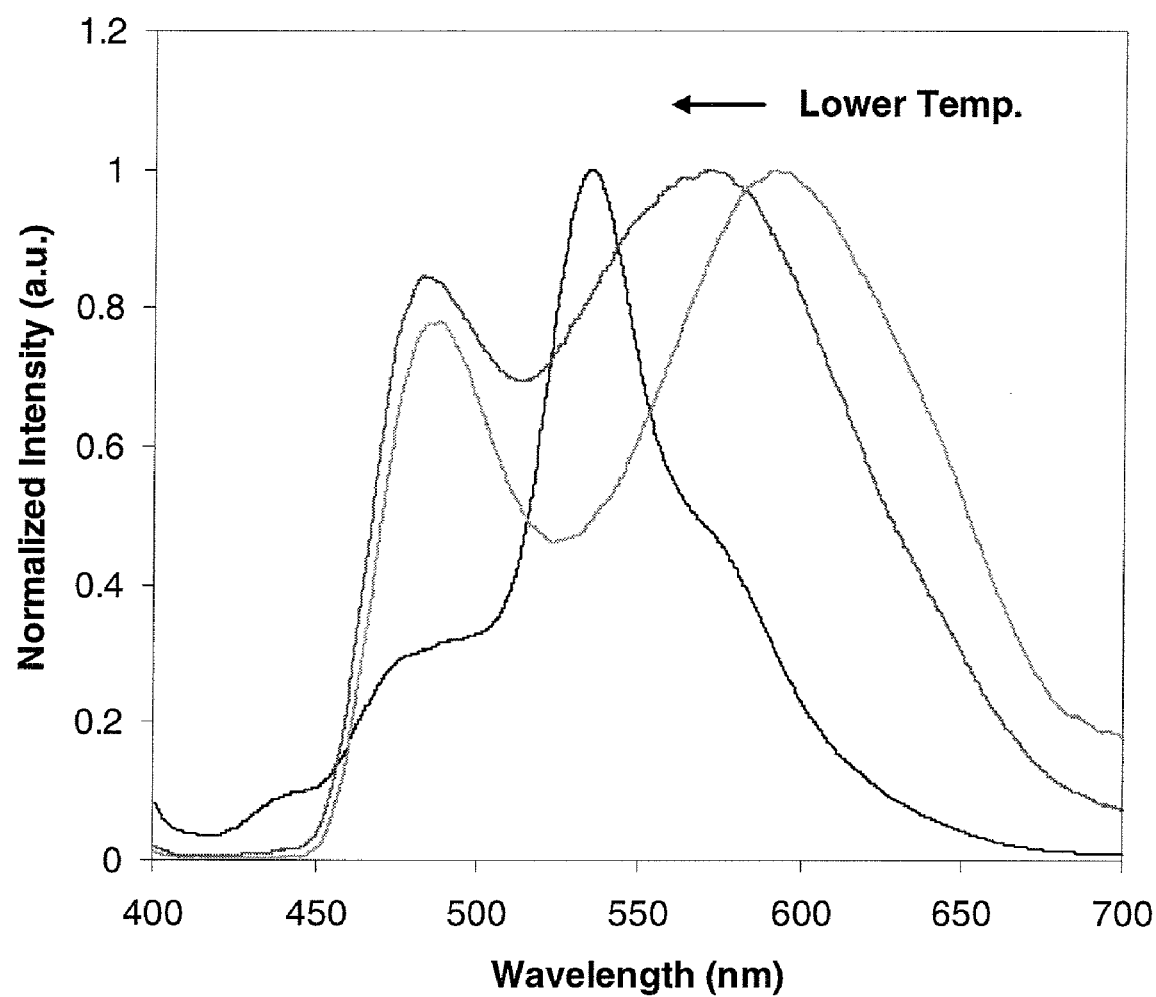
FIG. 5 illustrates changes in the total emission spectrum of B(dbmOH))$_2$Br in 4:1 MeOH/EtOH and blue shift in phosphorescence as the temperature is lowered.

The total emission spectrum of B(dbmOH)$_2$Br in 4:1 MeOH/EtOH upon cooling after excitation by a UV lamp ($\lambda_{max}$=365 nm) is illustrated in FIG. 5. The higher energy peak at about 480 nm is the fluorescence peak, and the progressively blue-shifting lower energy peak at about 600 nm is the phosphorescence peak. Temperature: from bottom to top at about −80° C. (~193K) to about −196° C. (~77K) (middle temperature not measured.

All patents, patent applications and literature cited in the specification are hereby incorporated by reference in their entirety. In the case of any inconsistencies, the present disclosure, including any definitions therein will prevail. The invention has been described with reference to various specific and preferred embodiments and techniques. However, it should be understood that many variations and modifications may be made while remaining within the invention.

Having thus described the preferred embodiments of the present invention, those of skill in the art will readily appreciate that the teachings found herein may be applied to yet other embodiments within the scope of the attached claims.

What is claimed is:

1. A luminescent dye compound having formula I:

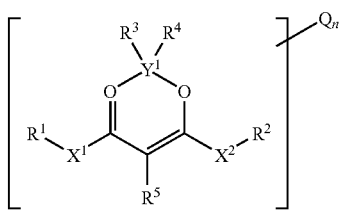

I wherein $R^1$ and $R^2$ are independently phenyl or naphthy; $R^1$ and $R^2$ are optionally independently substituted with 1, 2, or 3 substituent groups; where the substituent groups are halo, hydroxyl, methyl, methoxy, —O—CH$_2$—O CH$_3$ or —NC(=O)CH$_3$; or two substituent groups can form a ring together with the atom to which they are attached optionally having 5 ring atoms and optionally having 1 heteroatom;

$Y^1$ is Al or B; $X^1$ and $X^2$ are independently a bond, or —CH=CH—, $R^3$ and $R^4$ are independently, halo, hydroxyl, $R^{15}O(C_1$-$C_{12})$alkyl, or —OR$^{15}$; or $R^3$ and $R^4$ taken together form a bidentate chelate, or $R^3$ and $R^4$ taken together with the boron atom form a ring having the formula:

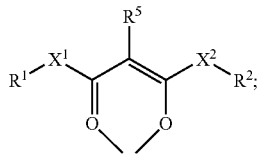

$R^5$ is hydrogen, or $R^5$ and the carbon to which it is attached have the formula:

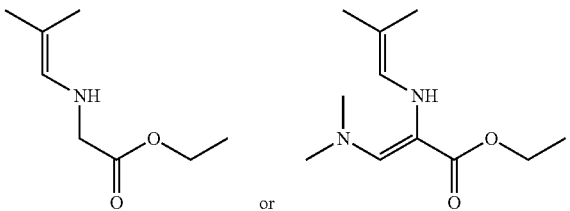

each Q is independently a non-toxic pharmaceutically acceptable, biologically stable or biodegradable polymer.

2. The compound of claim 1, wherein $R^1$ and $R^2$ are independently phenyl, or naphthyl.

3. The compound of claim 2, wherein at least one of $R^1$ and $R^2$ is phenyl.

4. The compound of claim 2, wherein at least one of $R^1$ and $R^2$ is naphthyl.

5. The compound of claim 1, wherein at least one of $R^1$ and $R^2$ has the formula

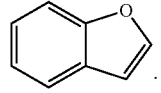

6. The compound of claim 1, wherein the $R^1$ and $R^2$ substituents are independently —OH, —OCH$_3$, or —O—CH$_2$—O CH$_3$.

7. The compound of claim 6, wherein the $R^1$ and $R^2$ substituents are independently —OH, or —OCH$_3$.

8. The compound of claim 1, wherein the $R^3$ and $R^4$ substituents are independently halo, hydroxy($C_1$-$C_{12}$)alkyl, halo ($C_1$-$C_{12}$)alkyl, $R^{15}O(C_1$-$C_{12})$alkyl, $R^{15}O(C_1$-$C_{12})$alkyl-O—, —OR$^{15}$, —CO$_2$R$^{15}$, —OC(O)R$^{16}$, —C(O)R$^{16}$, —NR$^{13}$R$^{14}$, —N(R$^{23}$)C(O)R$^{24}$, —C(O)NR$^{17}$R$^{18}$, —SR$^{19}$, or —SO$_2$R$^{20}$.

9. The compound of claim 8, wherein the $R^3$ and $R^4$ substituents are independently halo.

10. The compound of claim 9, wherein the $R^3$ and $R^4$ substituents are fluorine.

11. The compound of claim 1, wherein the $R^3$ and $R^4$ substituents are taken together to form a bidentate chelate.

12. The compound of claim 11 wherein the chelate is a diacid, acid-alcohol, or acid-ether group.

13. The compound of claim 12 wherein the diacid group is HOC(=O)CH$_2$C(=O)OH or HOC(=O)CH$_2$C(=O)OH.

14. The compound of claim 11 wherein $R^3$ and $R^4$ taken together with the boron atom form a ring having the formula:

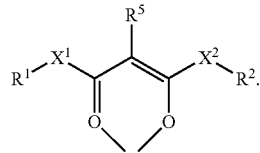

15. The compound of claim 1 wherein the polymer is attached through a group having the formula —O—R$^6$—O— where $R^6$ is alkylene, alkenylene having at least two carbon atoms.

16. The compound of claim 1, wherein each Q is independently a polylactide, polyglycolide, lactide-glycolide copolymer, polyethylene glycol polylactide, polycaprolactone, polycaprolactone-polylactide block copolymers, poly(methyl methacrylate), hydroxyl propyl cellulose, polyhydroxybutyrate, polyhydroxybutyrate-valerate copolymer, polybutylene succinate, polybutylene adipate-co-terephthalate, polyethylene glycol, or a mixture thereof.

17. The compound of claim 16, wherein each Q is independently a polylactide, polyglycolide, lactide-glycolide copolymer, polyethylene glycol polylactide, polycaprolactone-polylactide block copolymers, or a mixture thereof.

18. The compound of claim 1 wherein $R^1$ and $R^2$ are independently

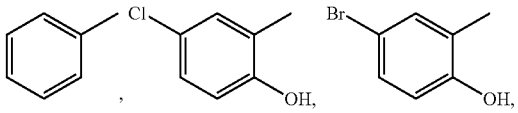

-continued
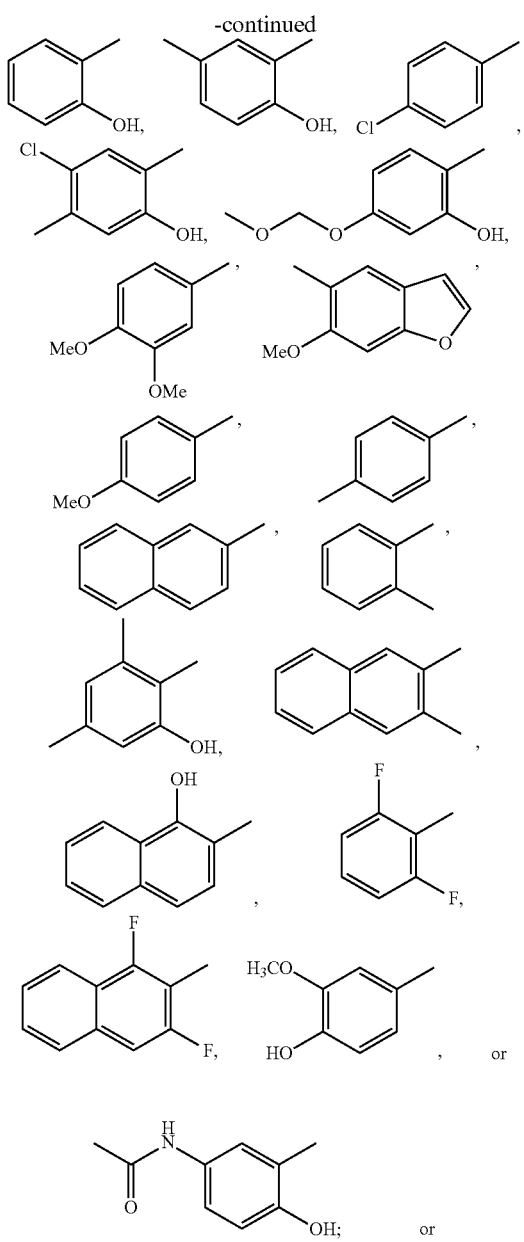
$R^5$ and $R^1$ or $R^2$ taken together form a group having the formula:
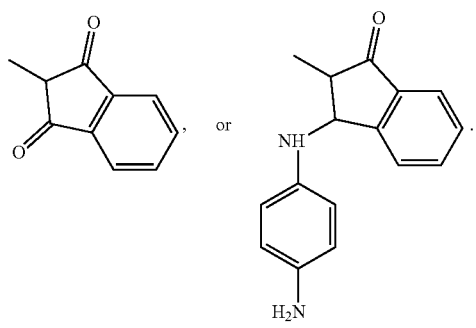
19. The compound of claim 1 wherein $R^5$ is:
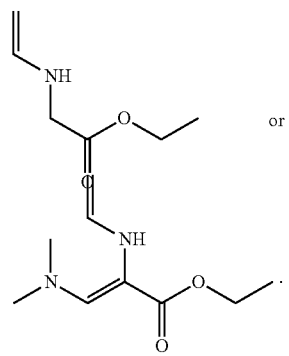
20. The compound of claim 1 wherein the luminescent dye is and formed from a compound having the formula:
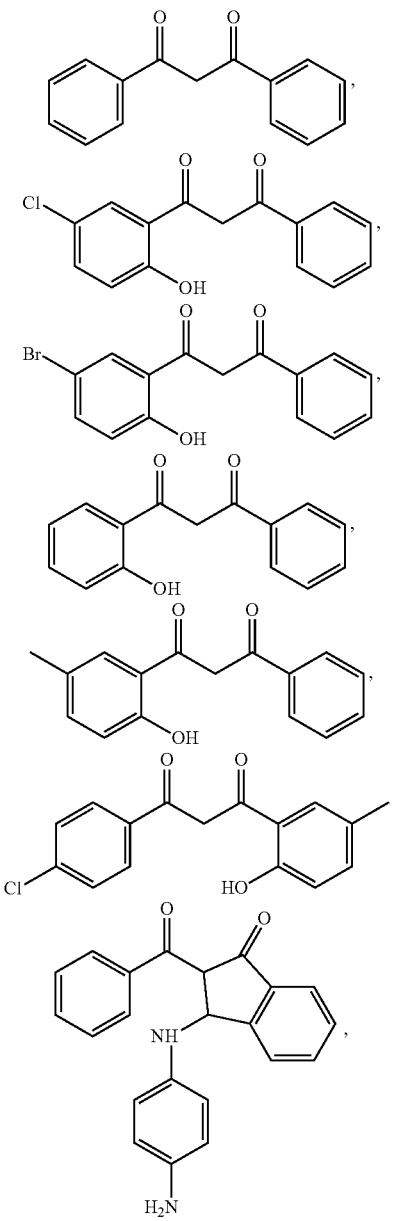

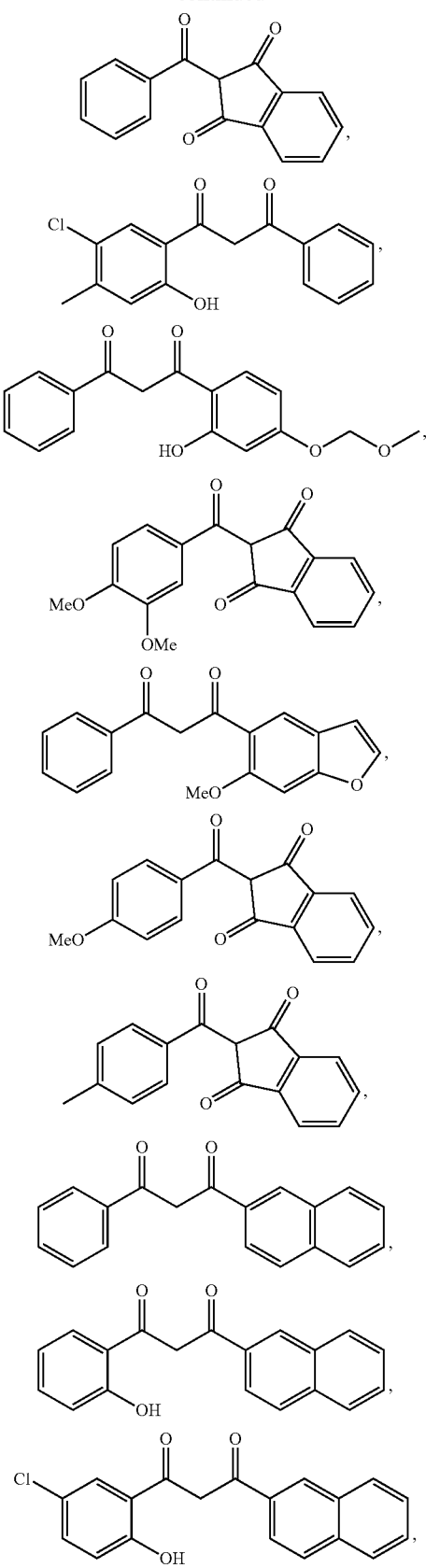
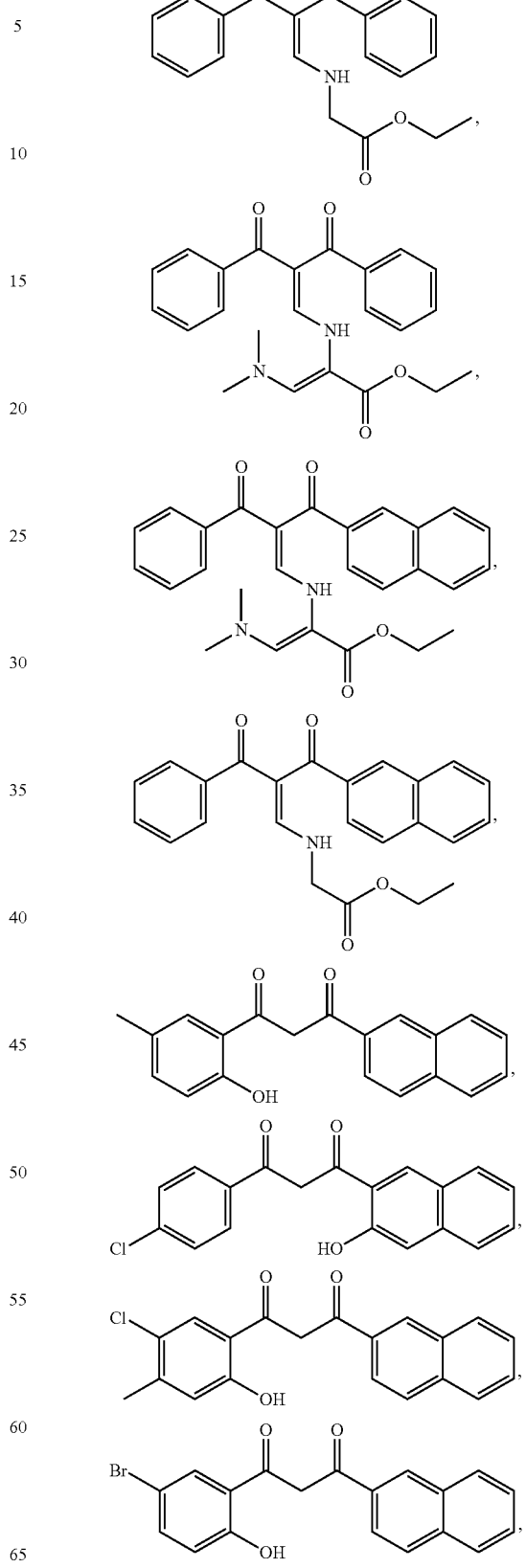

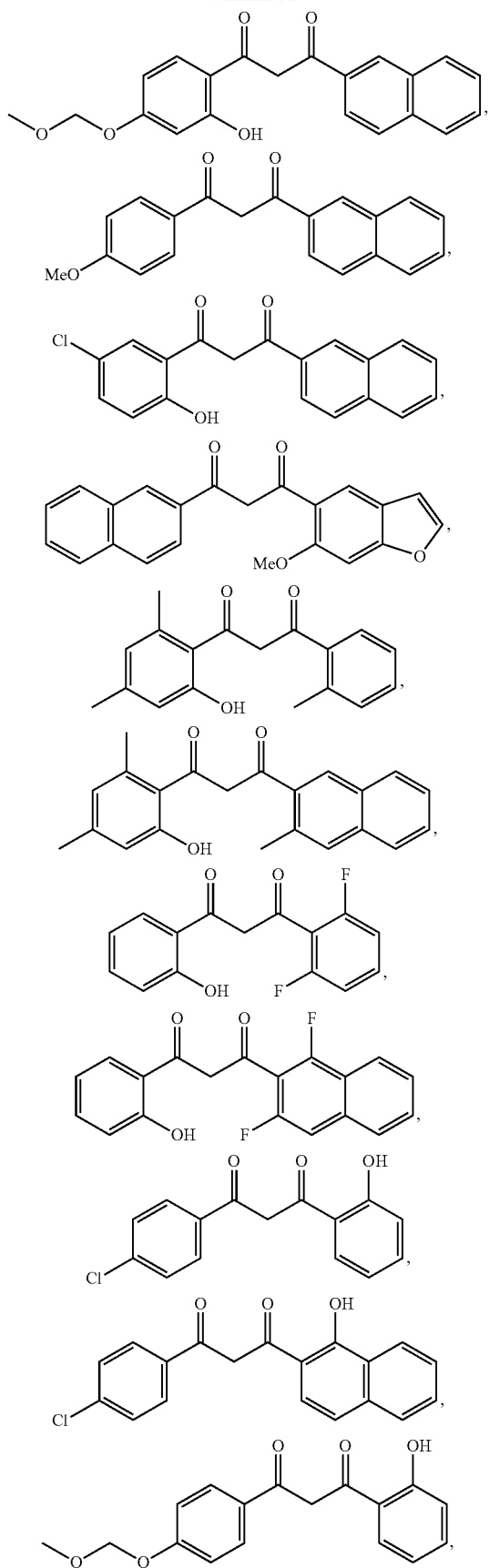
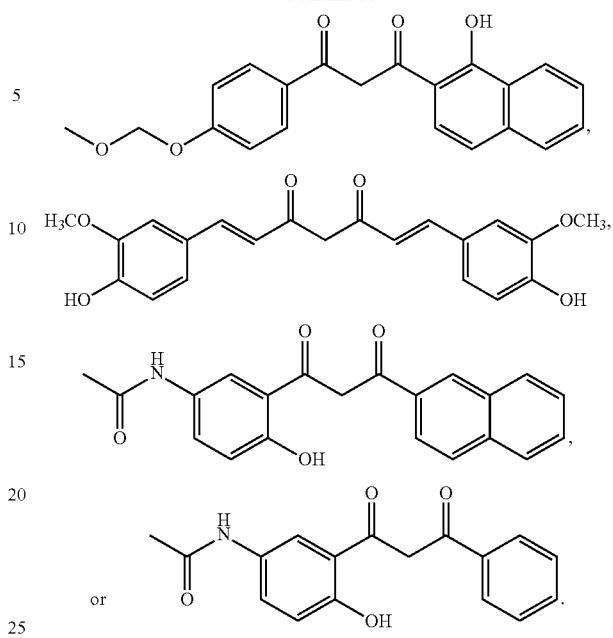
21. The compound of claim 1 wherein the $R^3$ and $R^4$ taken together are formed from a compound having the formula:
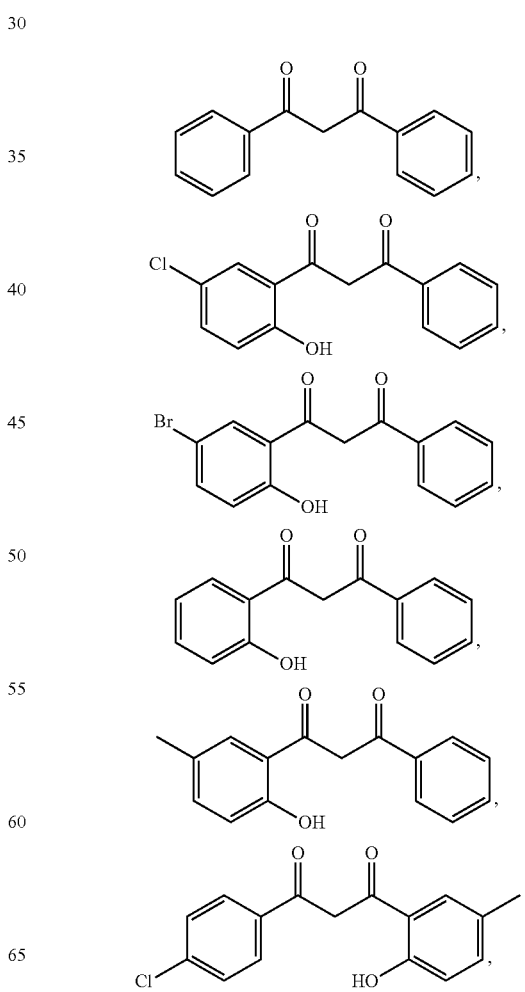

31
-continued
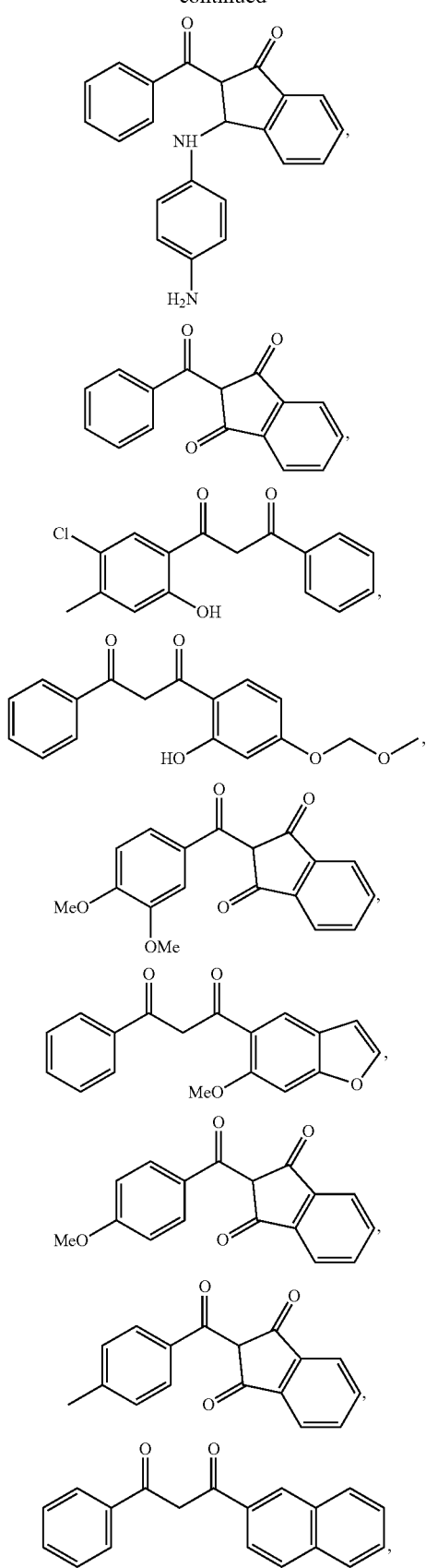
32
-continued
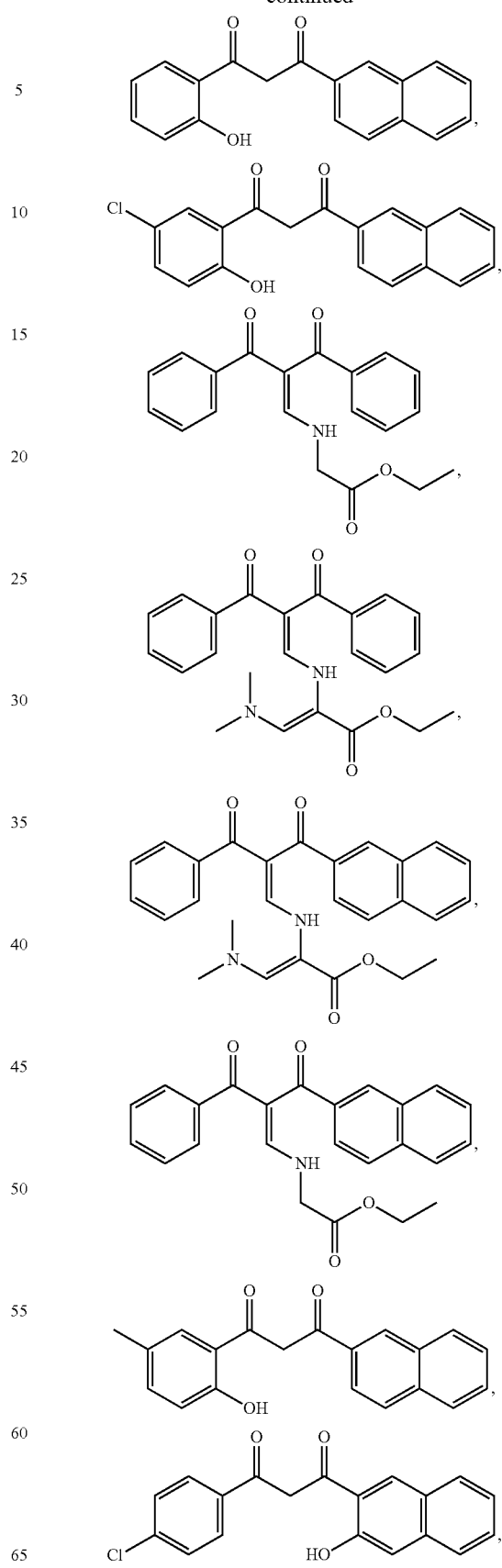

33
-continued
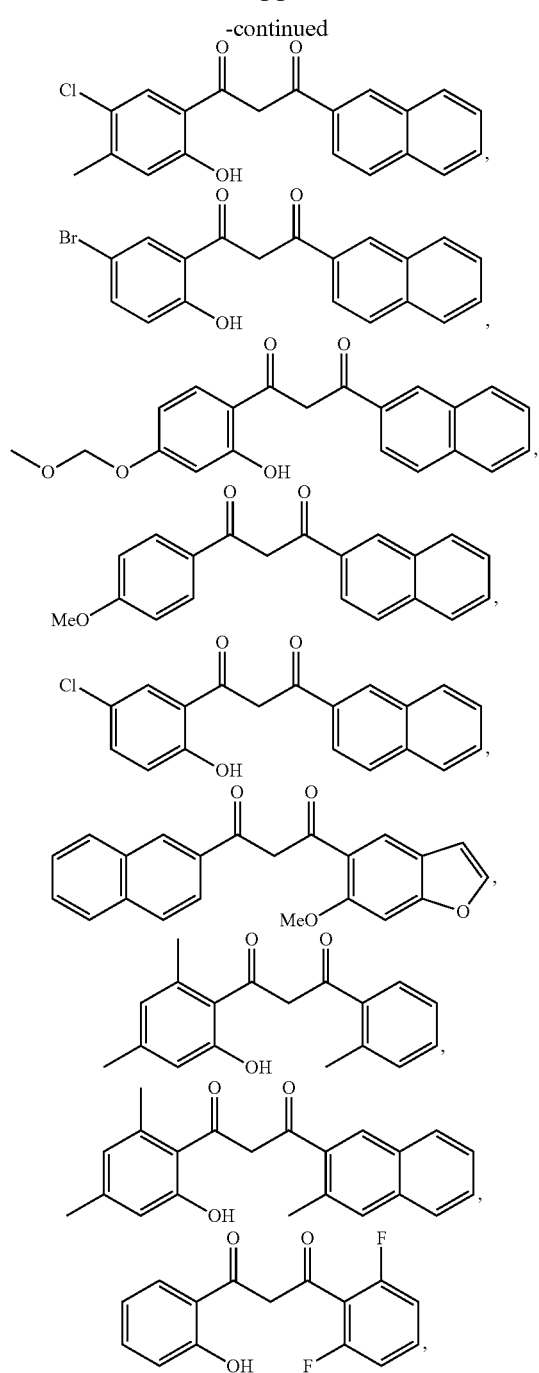
34
-continued
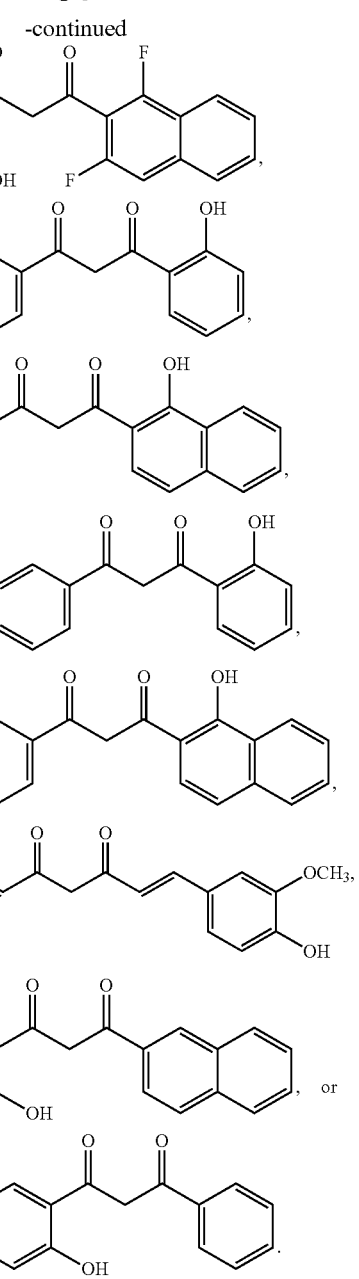
* * * * *